US011778610B2

(12) United States Patent
Yang et al.

(10) Patent No.: US 11,778,610 B2
(45) Date of Patent: *Oct. 3, 2023

(54) FRAMEWORK FOR SIMULTANEOUS PUCCH/PUSCH TRANSMISSIONS AND INTRA-UE MULTIPLEXING

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,828

(22) Filed: Aug. 19, 2022

(65) Prior Publication Data
US 2023/0105754 A1 Apr. 6, 2023

Related U.S. Application Data

(60) Provisional application No. 63/262,026, filed on Oct. 1, 2021.

(51) Int. Cl.
*H04W 72/12* (2023.01)
*H04W 72/1268* (2023.01)
(Continued)

(52) U.S. Cl.
CPC ....... *H04W 72/1268* (2013.01); *H04W 72/20* (2023.01); *H04W 72/569* (2023.01)

(58) Field of Classification Search
CPC ......... H04W 72/1268; H04W 72/1242; H04W 72/1278
See application file for complete search history.

(56) References Cited

U.S. PATENT DOCUMENTS 11,283,562 B1 * 3/2022 Chao ................. H04W 72/0453
2019/0159140 A1 * 5/2019 Wang .................... H04W 72/23
(Continued)

FOREIGN PATENT DOCUMENTS

WO WO-2021137554 A1 * 7/2021 ........... H04L 1/1664
WO WO-2021147761 A1 * 7/2021
(Continued)

OTHER PUBLICATIONS

International Search Report and Written Opinion—PCT/US2022/041082—ISA/EPO—dated Nov. 25, 2022.

*Primary Examiner* — Parth Patel
(74) *Attorney, Agent, or Firm* — Arun Swain; Procopio, Cory, Hargreaves & Savitch LLP

(57) ABSTRACT

A UE receives control signaling that indicates that the UE is scheduled to transmit one or more uplink control channel messages on a first component carrier that overlap in a time domain with one or more uplink shared channel messages scheduled for transmission on a second component carrier. The UE resolves a first overlap of uplink control channels having a same priority level, if present, and resolves, after resolving the first overlap, a second overlap of an uplink control channel and at least one uplink shared channel having the same priority level, if present. The UE resolves two or more channels having a different priority level after resolving the first overlap and the second overlap. The UE transmits one or more uplink transmissions including at least one of the one or more uplink control channel messages and the one or more uplink shared channel messages.

30 Claims, 19 Drawing Sheets

(51) Int. Cl.
    *H04W 72/20*     (2023.01)
    *H04W 72/566*     (2023.01)

(56) References Cited

U.S. PATENT DOCUMENTS

| | | | |
|---|---|---|---|
| 2020/0314900 A1 | 10/2020 | Hosseini et al. | |
| 2020/0365042 A1* | 11/2020 | Mahalingam | G08G 5/0069 |
| 2020/0412494 A1* | 12/2020 | Wu | H04L 1/1861 |
| 2021/0259010 A1* | 8/2021 | Yang | H04W 72/21 |
| 2022/0007356 A1* | 1/2022 | Lee | H04W 72/0446 |
| 2022/0007380 A1* | 1/2022 | Ito | H04W 56/001 |
| 2022/0287052 A1* | 9/2022 | Hwang | H04L 5/0055 |
| 2022/0353881 A1* | 11/2022 | Saber | H04W 72/1263 |

FOREIGN PATENT DOCUMENTS

| | | |
|---|---|---|
| WO | 2021161867 A1 | 8/2021 |
| WO | 2021163417 A1 | 8/2021 |
| WO | WO-2022155102 A1 * | 7/2022 |
| WO | WO-2022200366 A1 * | 9/2022 |

* cited by examiner

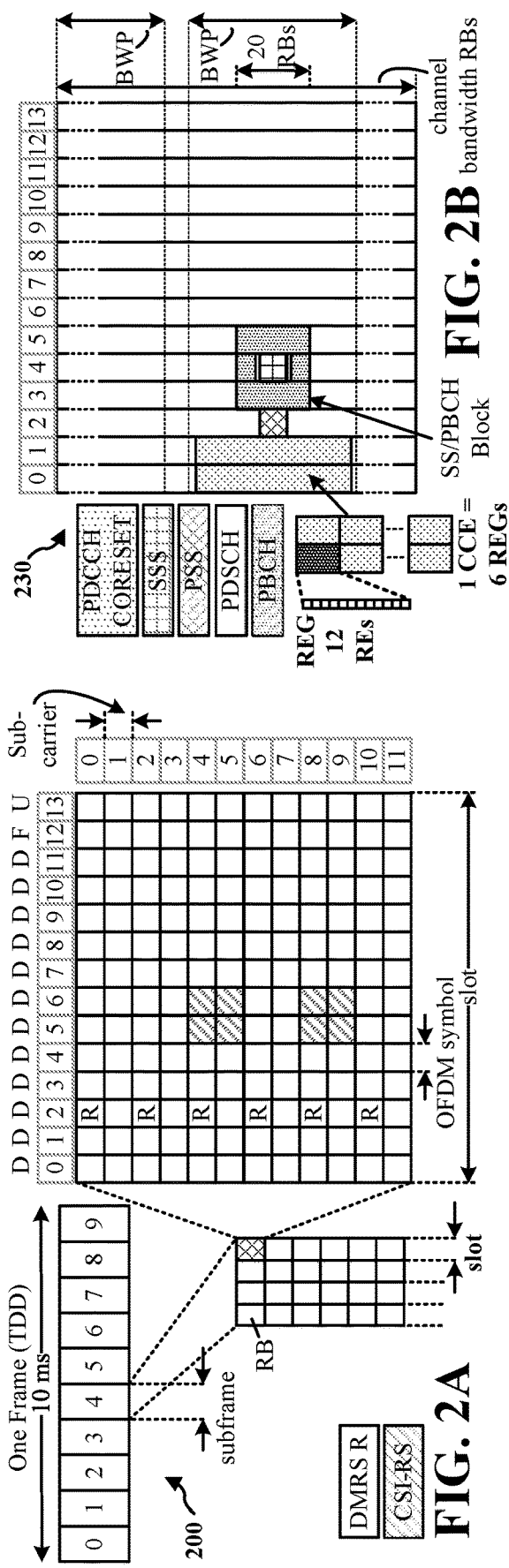
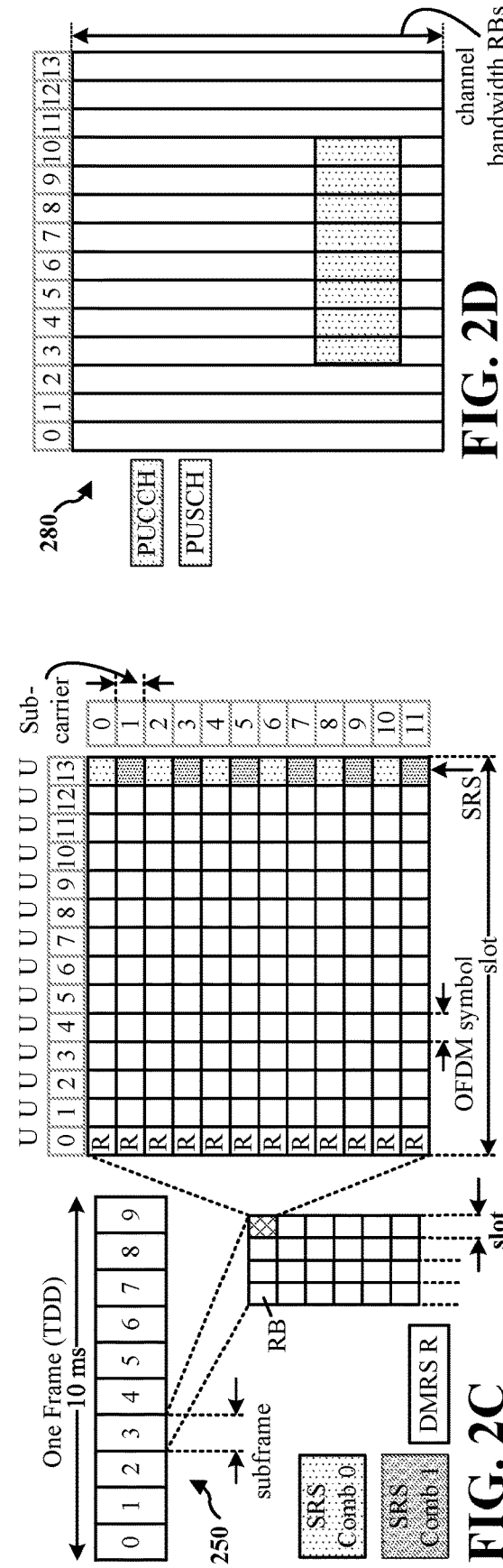

FRAMEWORK FOR SIMULTANEOUS PUCCH/PUSCH TRANSMISSIONS AND INTRA-UE MULTIPLEXING

CROSS REFERENCE TO RELATED APPLICATION(S)

This application claims the benefit of and priority to U.S. Provisional Application Ser. No. 63/262,026, entitled "Framework for Simultaneous PUCCH/PUSCH Transmissions and Intra-UE Multiplexing" and filed on Oct. 1, 2021, which is expressly incorporated by reference herein in its entirety.

TECHNICAL FIELD

The present disclosure relates generally to communication systems, and more particularly, to wireless communication including a control channel and a shared channel.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus receives control signaling that indicates that the UE is scheduled to transmit one or more uplink control channel messages on a first component carrier that overlap in a time domain with one or more uplink shared channel messages scheduled for transmission on a second component carrier. The apparatus resolves a first overlap of uplink control channels having a same priority level, if the first overlap is present. The apparatus resolves, after resolving the first overlap, a second overlap of an uplink control channel and at least one uplink shared channel having the same priority level, if the second overlap is present. The apparatus resolves two or more channels having a different priority level after resolving the first overlap and the second overlap. The apparatus transmits one or more uplink transmissions including at least one of the one or more uplink control channel messages and the one or more uplink shared channel messages.

In an aspect of the disclosure, a method, a computer-readable medium, and an apparatus for wireless communication at a UE are provided. The apparatus receives control signaling that indicates that the UE is scheduled to transmit one or more uplink control channel messages on a first component carrier that overlap in a time domain with one or more uplink shared channel messages scheduled for transmission on a second component carrier. The apparatus multiplexes overlapping transmissions per component carrier for the first component carrier and the second component carrier. The apparatus transmits a first uplink message on the first component carrier and a second uplink message on the second component carrier that overlap in the time domain, if a condition is satisfied, the first uplink message comprising the one or more uplink control channel message and the second uplink message comprising one or more uplink shared channel messages after the multiplexing. The apparatus transmits a single, multiplexed message comprising the first uplink message and the second uplink message, if the condition is not satisfied.

In an aspect of the disclosure, a method, a computer-readable medium, and an apparatus for wireless communication at a network node are provided. The apparatus transmits control signaling that schedules a UE to transmit one or more uplink control channel messages that overlap in a time domain with one or more uplink shared channel messages scheduled for transmission. The apparatus receives one or more uplink transmissions including at least one of the one or more uplink control channel messages and the one or more uplink shared channel messages based on: a first resolution of a first overlap of uplink control channels having a same priority level, if the first overlap is present; a second resolution after the first resolution of the first overlap, a second overlap of an uplink control channel and at least one uplink shared channel having the same priority level, if the second overlap is present; and a third resolution of two or more channels having a different priority level after the first resolution and the second resolution.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
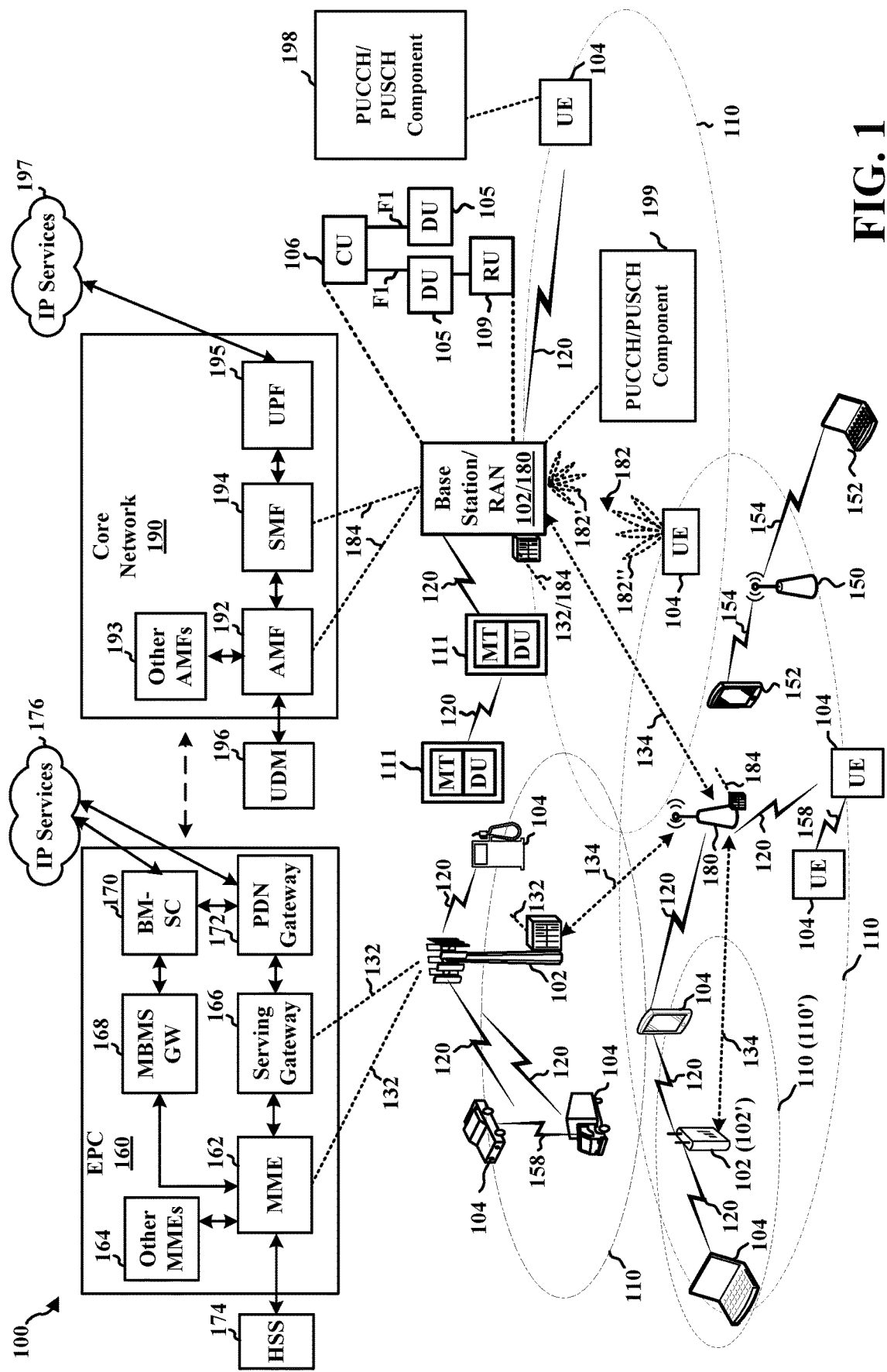
FIG. 1 is a diagram illustrating an example of a wireless communications system and an access network, in accordance with aspects presented herein.

A UE may exchange wireless traffic with a network. The traffic may have different reliability or latency requirements. As an example, the traffic may be associated with a priority index that indicates whether the traffic is higher priority traffic or lower priority traffic. In some aspects, a UE may drop (e.g., not transmit, skip transmission of, etc.) a lower priority uplink transmission that collides, e.g., would overlap in time, with a higher priority uplink transmission. For example, if a higher priority uplink channel would overlap in time with a lower priority uplink channel, the UE may drop the transmission of the lower priority uplink channel and may transmit the higher priority uplink channel. Some dropped transmissions may lead to inefficient wireless communication. As an example, if a HARQ-ACK from a UE is dropped (e.g., the UE does not transmit the HARQ-ACK) due to an overlap in time with a higher priority uplink transmission, a base station may not know that the UE received a downlink transmission correctly. The base station may then retransmit the downlink transmission even though the UE correctly received the first transmission.

Aspects presented herein provide a framework for the UE to determine resolve the multiple collisions. Aspects presented herein provide an order for resolving various types of collisions (e.g., PUCCH/PUSCH transmissions that would overlap in time). In some aspects, the UE may determine whether to transmit a simultaneous PUCCH/PUSCH transmission or to multiplex the PUCCH into the PUSCH transmission (e.g., intra-UE multiplexing), if the UE is scheduled with a PUSCH transmission that would overlap with a PUCCH transmission on a different cell. In some aspects, the UE may determine whether to drop a PUCCH transmission or a PUSCH transmission, if the UE is scheduled with a PUSCH transmission that would overlap with a PUCCH on a different cell. In some aspects, more than two channels may overlap, and aspects presented herein provide a framework for the UE to determine resolve the multiple collisions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN). The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, the UE 104 may control signaling that indicates that the UE is scheduled to transmit one or more uplink control channel messages on a first component carrier that overlap in a time domain with one or more uplink shared channel messages scheduled for transmission on a second component carrier. The UE 104 may include a PUCCH/PUSCH component 198 that is configured to resolve a first overlap of uplink control channels having a same priority level, if the first overlap is present; resolve, after resolving the first overlap, a second overlap of an uplink control channel and at least one uplink shared channel having the same priority level, if the second overlap is present; and resolve two or more channels having a different priority level after resolving the first overlap and the second overlap. The UE 104 may then transmit one or more uplink transmissions including at least one of the one or more uplink control channel messages and the one or more uplink shared channel messages. In some aspects, the PUCCH/PUSCH component 198 may be configured to multiplex overlapping transmissions per component carrier for the first component carrier and the second component carrier; and transmit a first uplink message on the first component carrier and a second uplink message on the second component carrier that overlap in the time domain, if a condition is satisfied, the first uplink message comprising the one or more uplink control channel message and the second uplink message comprising one or more uplink shared channel messages after the multiplexing; or transmit a single, multiplexed message comprising the first uplink message and the second uplink message, if the condition is not satisfied.

In certain aspects, the base station 180 may include a PUCCH/PUSCH reception component 199 configured to transmit the control signaling to the UE 104 indicating that that the UE is scheduled to transmit one or more uplink control channel messages on a first component carrier that overlap in a time domain with one or more uplink shared channel messages scheduled for transmission on a second component carrier, and to receive simultaneous PUCCH/PUSCH on different component carriers or a single multiplexed uplink transmission on one component carrier, e.g., based on the capability and/or configuration of the UE. Although the following description may be focused on 5G NR, the concepts described herein may be applicable to other similar areas, such as LTE, LTE-A, CDMA, GSM, and other wireless technologies.

Figure 16:
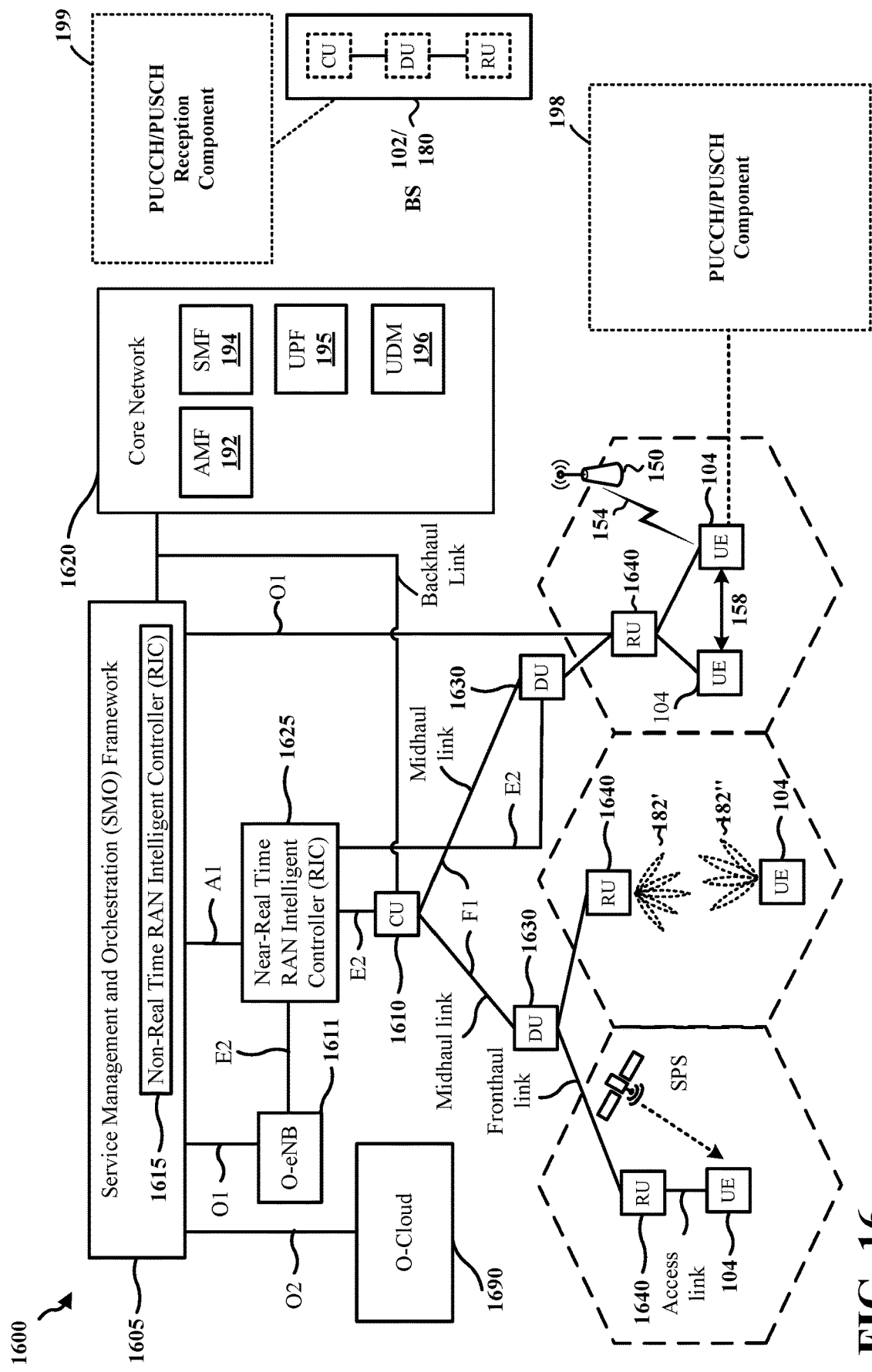
FIG. 16 is a diagram of an example disaggregated base station architecture, in accordance with aspects presented herein.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station. FIG. 16 is a diagram 1600 illustrating an example of a wireless communication system and an access network, similar to FIG. 1. The illustrated system in FIG. 16 includes an example disaggregated base station architecture.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the (O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture may include one or more central units (CUs) 1610 that can communicate directly with a core network 1620 via a backhaul link, or indirectly with the core network 1620 through one or more disaggregated base station units (such as a Near-Real Time (Near-RT) RAN Intelligent Controller (RIC) 1625 via an E2 link, or a Non-Real Time (Non-RT) MC 1615 associated with a Service Management and Orchestration (SMO) Framework 1605, or both). A CU 1610 may communicate with one or more distributed units (DUs) 1630 via respective midhaul links, such as an F1 interface. The DUs 1630 may communicate with one or more radio units (RUs) 1640 via respective fronthaul links. The RUs 1640 may communicate with respective UEs 104 via one or more radio frequency (RF) access links. In some implementations, the UE 104 may be simultaneously served by multiple RUs 1640.

Each of the units, i.e., the CUs 1610, the DUs 1630, the RUs 1640, as well as the Near-RT RICs 1625, the Non-RT RICs 1615 and the SMO Framework 1605, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1610 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1610. The CU 1610 may be configured to handle user plane functionality (i.e., Central Unit—User Plane (CU-UP)), control plane functionality (i.e., Central Unit—Control Plane (CU-CP)), or a combination thereof. In some implementations, the CU 1610 can be logically split into one or more CU-UP units and one or more CU-CP units. The CU-UP unit can communicate bidirectionally with the CU-CP unit via an interface, such as the E1 interface when implemented in an O-RAN configuration. The CU 1610 can be implemented to communicate with the DU 1630, as necessary, for network control and signaling.

The DU 1630 may correspond to a logical unit that includes one or more base station functions to control the operation of one or more RUs 1640. In some aspects, the DU 1630 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1630 may further host one or more low PHY layers. Each layer (or module) can be implemented with an interface configured to communicate signals with other layers (and modules) hosted by the DU 1630, or with the control functions hosted by the CU 1610.

Lower-layer functionality can be implemented by one or more RUs 1640. In some deployments, an RU 1640, controlled by a DU 1630, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1640 can be implemented to handle over the air (OTA) communication with one or more UEs 104. In some implementations, real-time and non-real-time aspects of control and user plane communication with the RU(s) 1640 can be controlled by the corresponding DU 1630. In some scenarios, this configuration can enable the DU(s) 1630 and the CU 1610 to be implemented in a cloud-based RAN architecture, such as a vRAN architecture.

The SMO Framework 1605 may be configured to support RAN deployment and provisioning of non-virtualized and virtualized network elements. For non-virtualized network elements, the SMO Framework 1605 may be configured to support the deployment of dedicated physical resources for RAN coverage requirements which may be managed via an operations and maintenance interface (such as an O1 interface). For virtualized network elements, the SMO Framework 1605 may be configured to interact with a cloud computing platform (such as an open cloud (O-Cloud) 1690) to perform network element life cycle management (such as to instantiate virtualized network elements) via a cloud computing platform interface (such as an O2 interface). Such virtualized network elements can include, but are not limited to, CUs 1610, DUs 1630, RUs 1640 and Near-RT RICs 1625. In some implementations, the SMO Framework 1605 can communicate with a hardware aspect of a 4G RAN, such as an open eNB (O-eNB) 1611, via an O1 interface. Additionally, in some implementations, the SMO Framework 1605 can communicate directly with one or more RUs 1640 via an O1 interface. The SMO Framework 1605 also may include a Non-RT RIC 1615 configured to support functionality of the SMO Framework 1605.

The Non-RT RIC 1615 may be configured to include a logical function that enables non-real-time control and optimization of RAN elements and resources, artificial intelligence/machine learning (AI/ML) workflows including model training and updates, or policy-based guidance of applications/features in the Near-RT RIC 1625. The Non-RT RIC 1615 may be coupled to or communicate with (such as via an A1 interface) the Near-RT MC 1625. The Near-RT MC 1625 may be configured to include a logical function that enables near-real-time control and optimization of RAN elements and resources via data collection and actions over an interface (such as via an E2 interface) connecting one or more CUs 1610, one or more DUs 1630, or both, as well as an O-eNB, with the Near-RT MC 1625.

In some implementations, to generate AI/ML models to be deployed in the Near-RT RIC 1625, the Non-RT RIC 1615 may receive parameters or external enrichment information from external servers. Such information may be utilized by the Near-RT RIC 1625 and may be received at the SMO Framework 1605 or the Non-RT RIC 1615 from non-network data sources or from network functions. In some examples, the Non-RT RIC 1615 or the Near-RT RIC 1625 may be configured to tune RAN behavior or performance. For example, the Non-RT RIC 1615 may monitor long-term trends and patterns for performance and employ AI/ML models to perform corrective actions through the SMO Framework 1605 (such as reconfiguration via O1) or via creation of RAN management policies (such as A1 policies). At least one of the CU 1610, the DU 1630, and the RU 1640 may be referred to as a base station 102/180. Accordingly, a base station 102/180 may include one or more of the CU 1610, the DU 1630, and the RU 1640 (each component indicated with dotted lines to signify that each component may or may not be included in the base station 102/180). The base station 102/180 provides an access point to the core network 120 for a UE 104.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |

| μ | SCS $\Delta f = 2^\mu \cdot 15$ [kHz] | Cyclic prefix |
|---|---|---|
| 2 | 60 | Normal, Extended |
| 3 | 120 | Normal |
| 4 | 240 | Normal |

For normal CP (14 symbols/slot), different Numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
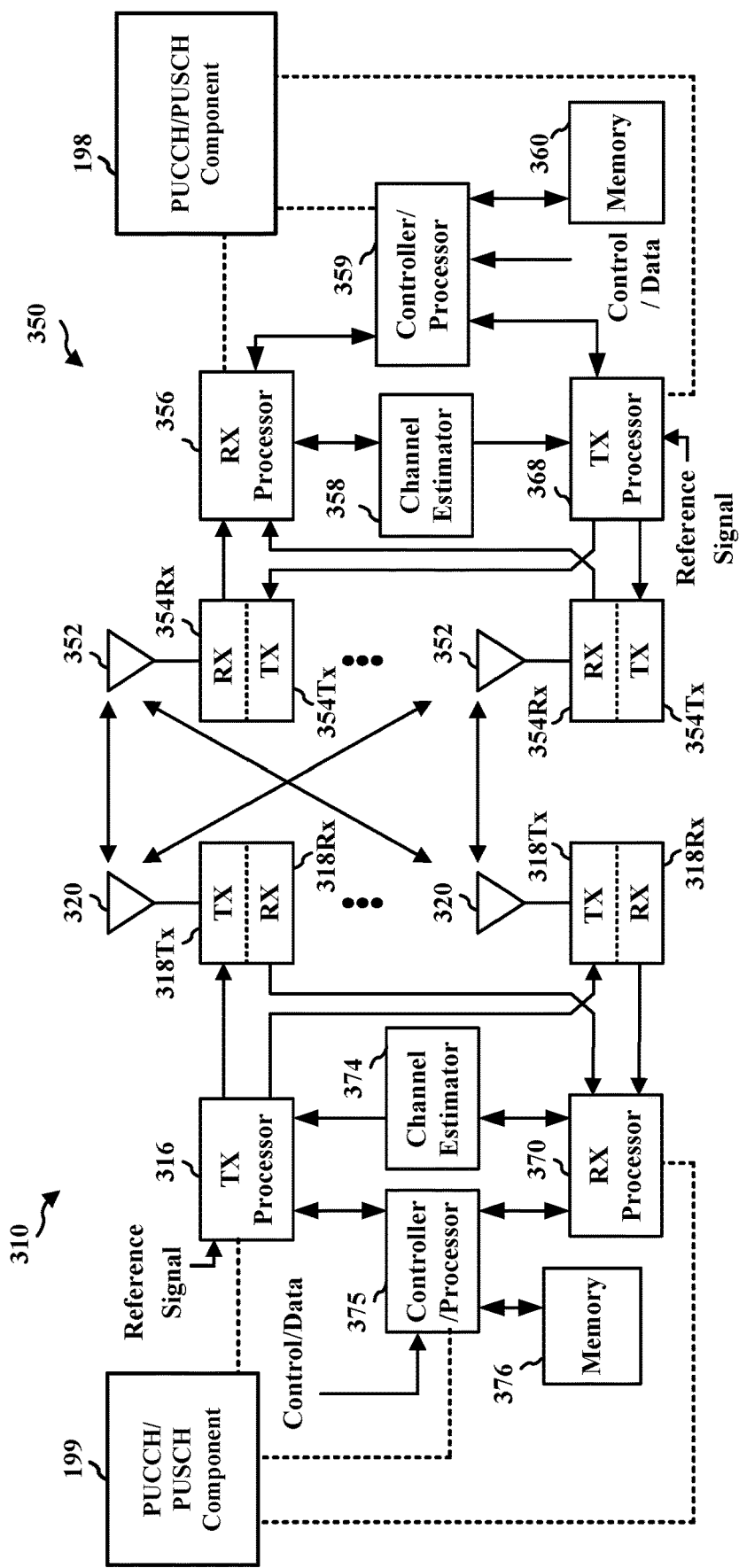
FIG. 3 is a diagram illustrating an example of a base station and user equipment (UE) in an access network, in accordance with aspects presented herein.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may include a PUCCH/PUSCH component 198 that is configured to perform aspects described in connection with FIG. 1.

At least one of the TX processor 316, the RX processor 370, and the controller/processor 375 may include a PUCCH/PUSCH reception component 199 configured to perform aspects described in connection with FIG. 1.

A UE may exchange wireless traffic with a network. The traffic may have different reliability or latency requirements. As an example, the traffic may be associated with a priority index that indicates whether the traffic is higher priority traffic or lower priority traffic. As an example, a priority index 0 may correspond to a lower priority level, and traffic with priority index 0 may be referred to herein as low priority traffic (e.g., LP traffic). A priority index 1 may correspond to a higher priority level, and traffic with a priority index 1 may be referred to herein as high priority traffic (e.g., HP traffic). As non-limiting examples to illustrate the concept, lower priority traffic may include eMBB traffic, and higher priority traffic may include URLLC traffic. In some aspects, a UE may drop (e.g., not transmit, skip transmission of, etc.) a lower priority uplink transmission that collides, e.g., would overlap in time, with a higher priority uplink transmission. For example, if a higher priority uplink channel would overlap in time with a lower priority uplink channel, the UE may drop the transmission of the lower priority uplink channel and may transmit the higher priority uplink channel. Some dropped transmissions may lead to inefficient wireless communication. As an example, if a HARQ-ACK from a UE is dropped (e.g., the UE does not transmit the HARQ-ACK) due to an overlap in time with a higher priority uplink transmission, a base station may not know that the UE received a downlink transmission correctly. The base station may then retransmit the downlink transmission even though the UE correctly received the first transmission.

In some aspects, a UE may multiplex transmissions that would overlap in time. Such multiplexing may be referred to as intra-UE multiplexing (e.g., intra-UE MUX) in some aspects. As an example, resources for UCI may overlap in time with another PUCCH transmission or PUSCH transmission, and the UE may multiplex the UCI with the PUCCH or the PUSCH transmission. A PUSCH or a PUCCH transmission, including any repetitions, can be of different priorities, such as priority index 0 or of priority index 1.

When transmission of PUCCH(s) and PUSCH(s) of different priority levels would overlap in time, a UE may first resolve the overlap between uplink channels (e.g., PUCCH (s) and/or PUSCH(s)) having a same priority level. After resolving the overlap between uplink channels of the same priority level, the UE may resolve the overlap between PUCCH(s) and/or PUSCH(s) having different priority levels.

Some UEs may be capable of transmitting PUCCH and PUSCH simultaneously, e.g., on respective cells. For example, the UE may support transmission of PUCCH on a first component carrier (CC) and transmission of PUSCH on a second CC that overlaps in time with the transmission of the PUCCH. In some aspects, the UE may determine whether to transmit a simultaneous PUCCH/PUSCH transmission or to multiplex the PUCCH into the PUSCH transmission (e.g., intra-UE multiplexing), if the UE is scheduled with a PUSCH transmission that would overlap with a PUCCH transmission on a different cell. In some aspects, the UE may determine whether to drop a PUCCH transmission or a PUSCH transmission, if the UE is scheduled with a PUSCH transmission that would overlap with a PUCCH on a different cell. In some aspects, more than two channels may overlap, and aspects presented herein provide a framework for the UE to determine resolve the multiple collisions. Aspects presented herein provide an order for resolving various types of collisions (e.g., PUCCH/PUSCH transmissions that would overlap in time).

Figure 4:
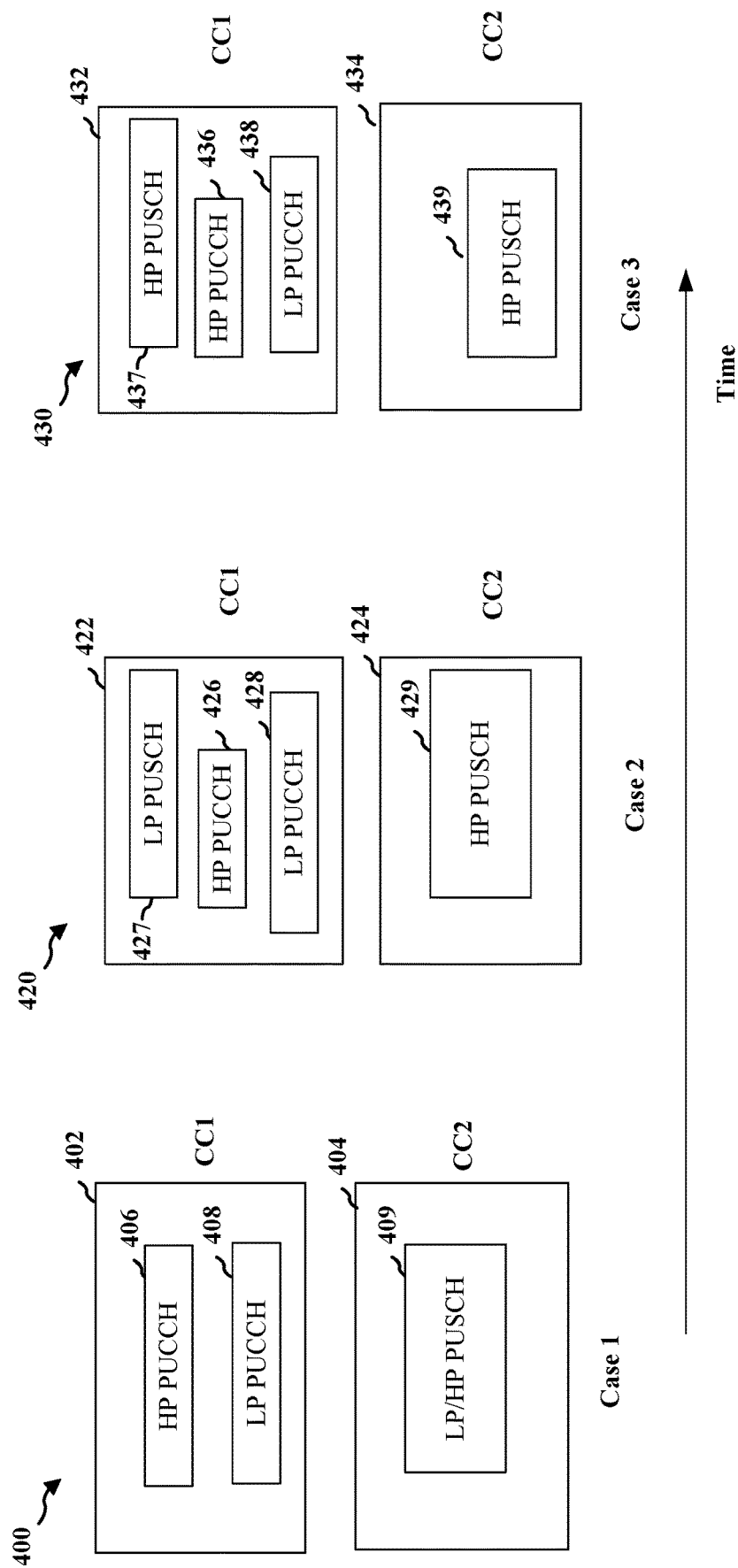
FIG. 4 is a resource diagram that illustrates scenarios of overlapping PUCCH and PUSCH messages, in accordance with various aspects of the present disclosure.

FIG. 4 illustrates various scenarios of overlapping PUCCH and PUSCH on different cells, or CCs. As illustrated in the different examples in FIG. 4, the overlapping uplink transmissions may be on the same CC and/or on different CCs, and may include two or more channel transmission of a same priority, and/or may include two or more channel transmissions of different priorities. In a first example 400, multiple PUCCH are scheduled for transmission on a first CC 402 and a PUSCH 409 is scheduled for transmission on a second CC 404 at an overlapping time. The multiple PUCCH on the first CC 402 include a lower priority PUCCH 408 and a higher priority PUCCH 406. The PUSCH 409 may include a lower priority PUSCH or a higher priority PUSCH.

In a second example 420, multiple PUCCH and a PUSCH 427 are scheduled for transmission on a first CC 422 and a PUSCH 429 is scheduled for transmission on a second CC 424 at an overlapping time. The multiple PUCCH on the first CC 422 include a lower priority PUCCH 428 and a higher priority PUCCH 426. The PUSCH 427 on the first CC 422 may be a lower priority PUSCH. The PUSCH 429 on the second CC 424 may be a higher priority PUSCH.

In a third example 430, multiple PUCCH and a PUSCH 437 are scheduled for transmission on a first CC 422 and a PUSCH 429 is scheduled for transmission on a second CC 424 at an overlapping time. The multiple PUCCH on the first CC 432 include a lower priority PUCCH 438 and a higher priority PUCCH 436. The PUSCH 437 on the first CC 432 may be a higher priority PUSCH. The PUSCH 439 on the second CC 434 may be a higher priority PUSCH.

Figure 17:
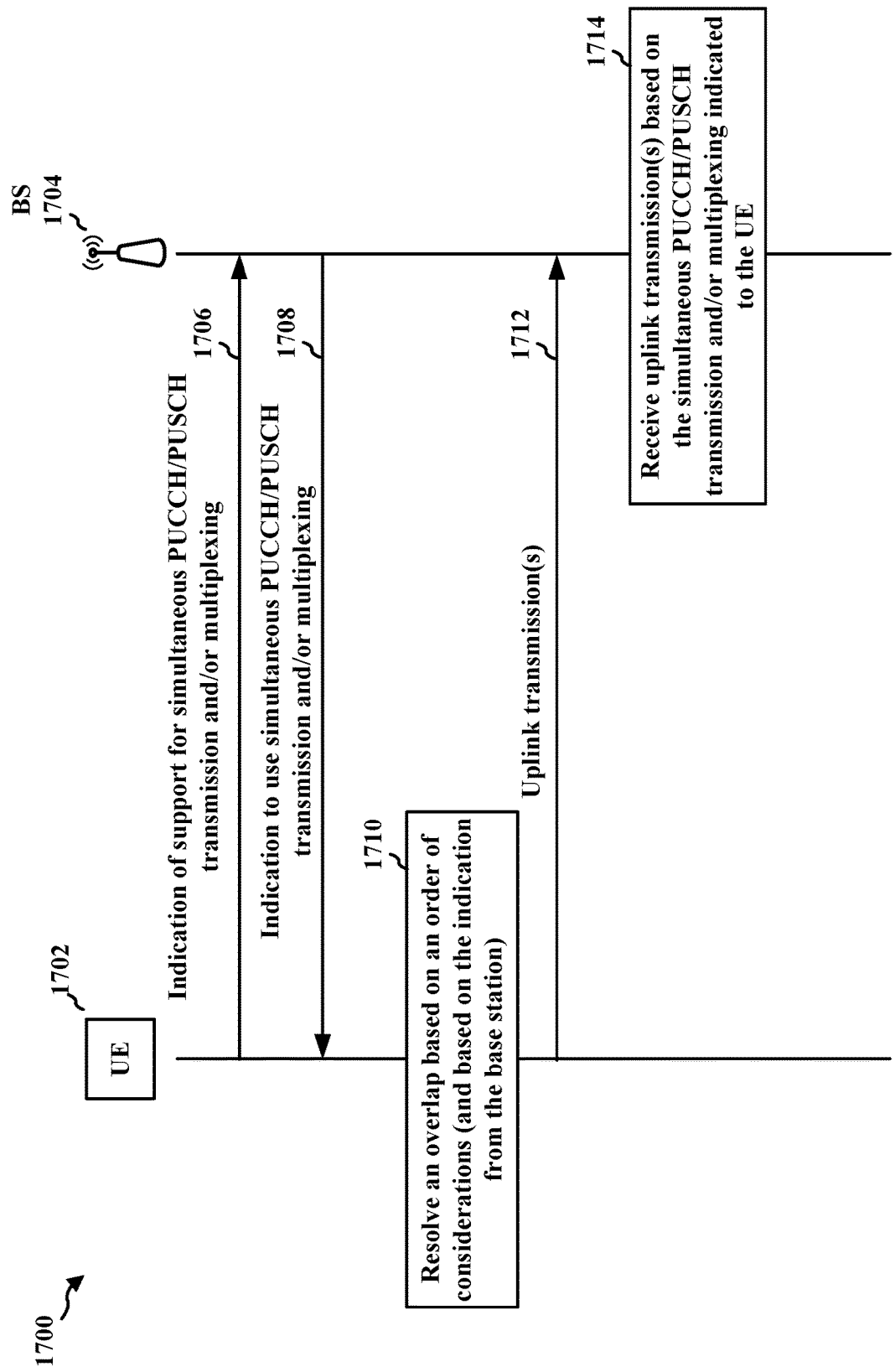
FIG. 17 illustrates an example communication flow between a UE and a base station, in accordance with aspects presented herein.

A UE may support the simultaneous PUCCH/PUSCH transmission, e.g., on different CCs. The UE may also support intra-UE multiplexing, e.g., multiplexing between channels for transmissions of different priorities. FIG. 17 illustrates an example communication flow 1700 between a UE 1702 and a base station 1704. Although aspects are described as being performed by a base station, the aspects may be performed by a base station in aggregation, or may be performed by one or more components of a base station, such as a CU 1610, DU 1630, and/or RU 1640. The UE 1702 may transmit an indication 1706 to the base station 1704 of the simultaneous PUCCH/PUSCH transmission capability and/or the intra-UE multiplexing capability. In some aspects, the base station 1704 may configure the UE 1702, enable, activate, or otherwise indicate, at 1708, for the UE 1702 to perform simultaneous PUCCH/PUSCH transmission, e.g., on different CCs, and/or intra-UE multiplexing.

Based on the capability of the UE 1702 and/or the configuration by the base station 1704, the UE 1702 may resolve the overlap based on an order of considerations, at 1710. FIGS. 5-14 illustrate various aspects that the UE may perform, at 1710, to resolve the overlap between multiple PUCCH and PUSCH transmissions. The UE 1702 may transmit the uplink transmission, whether simultaneous transmissions and/or a multiplexed transmission, at 1712. In some aspects, as shown at 1714, the base station 1704 may receive the one or more uplink transmissions based on the indication provided to the UE at 1708.

Figure 5:
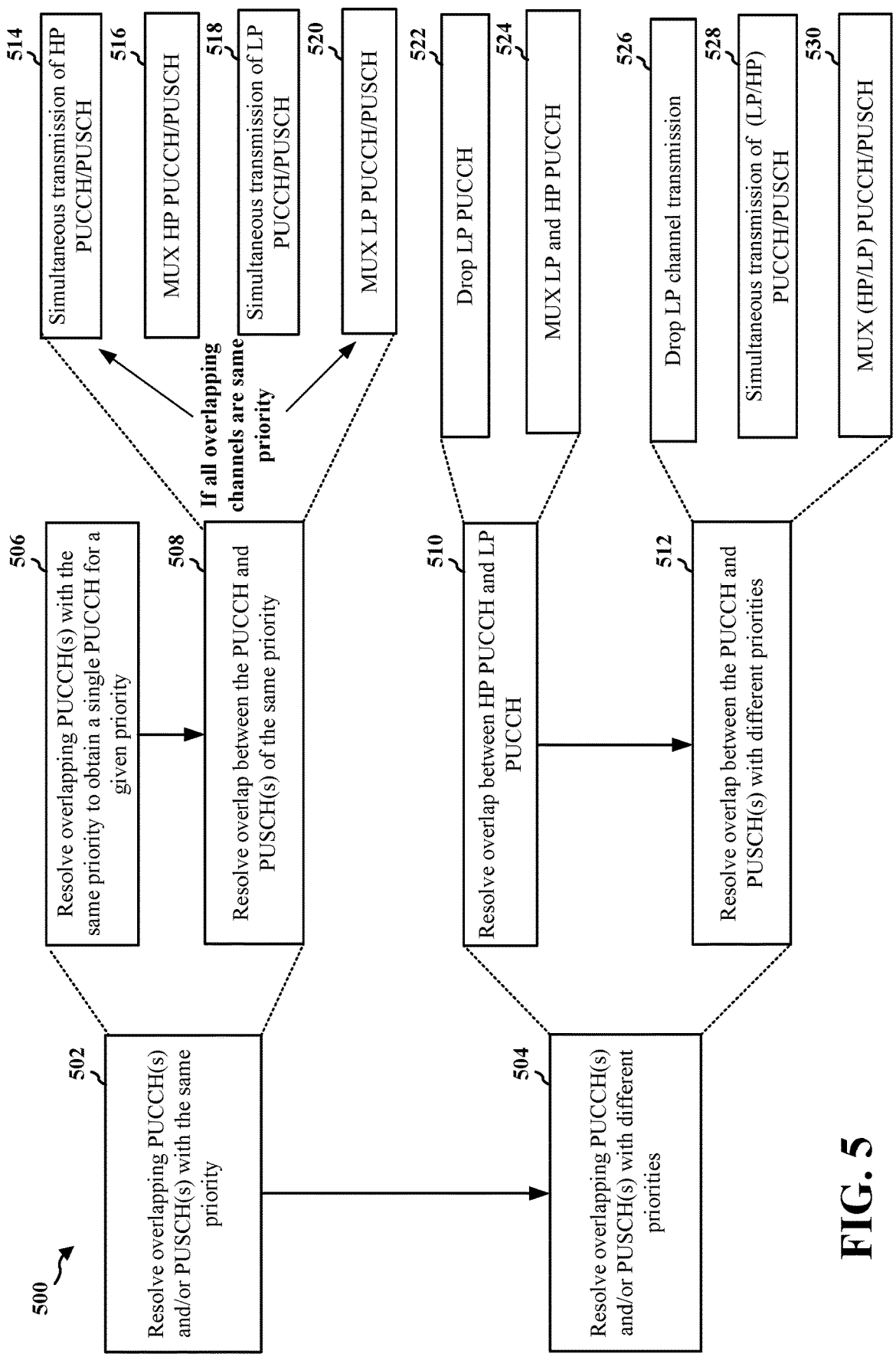
FIG. 5 illustrates an example framework or process for resolving various scenarios of overlapping PUCCH and PUSCH messages, in accordance with aspects presented herein.
Figure 6:
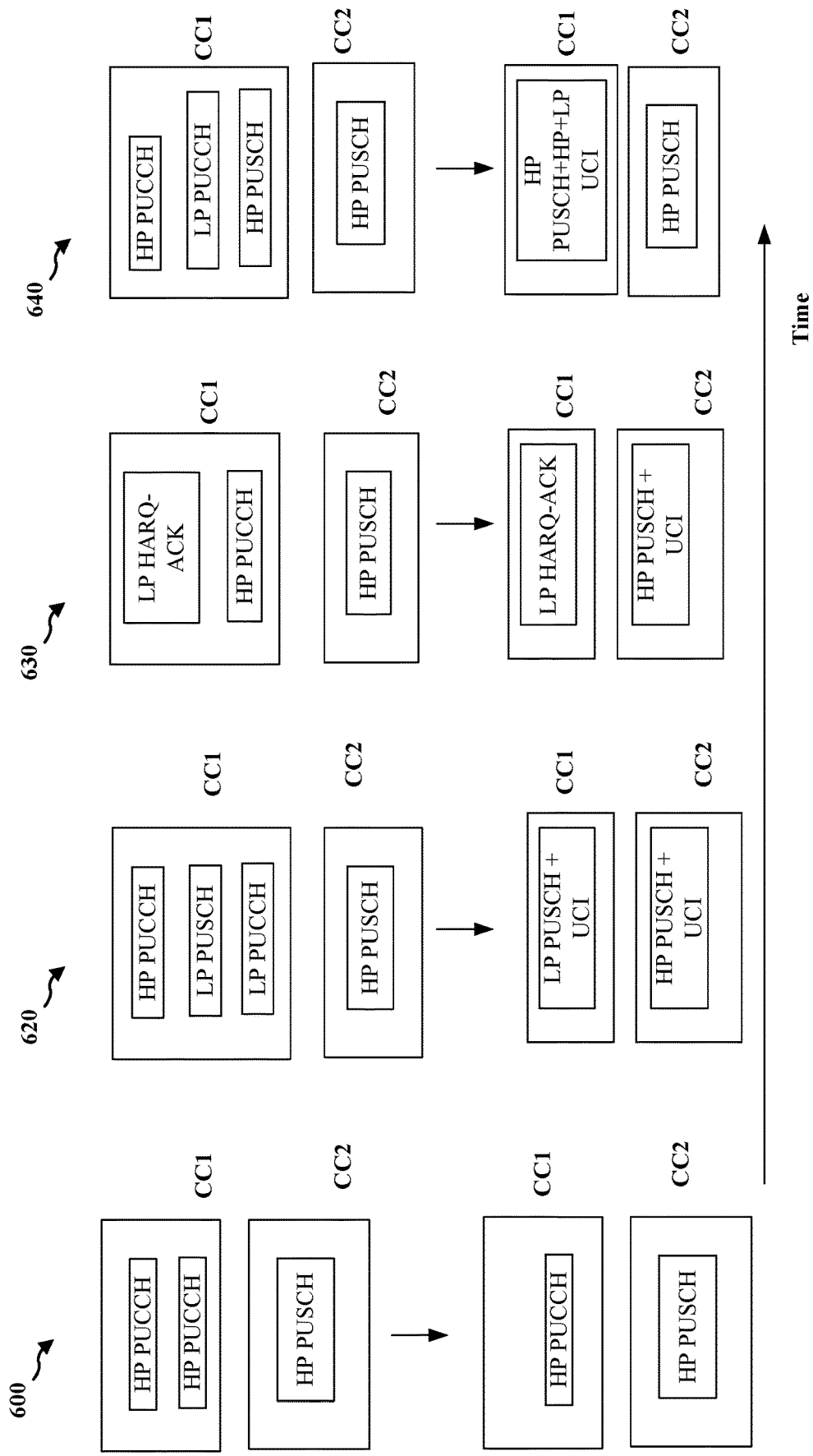
FIG. 6 illustrates example aspects of resolving various scenarios of overlapping PUCCH and PUSCH messages, in accordance with aspects presented herein.

FIG. 5 illustrates an example 500 of aspects of considerations that may be performed by the UE, at 1710, to resolve overlaps between multiple PUCCH and PUSCH transmissions, e.g., including the examples of overlaps in FIG. 4. FIG. 6 illustrates various examples of overlapping transmissions and the way in which the overlaps may be resolved with the order of consideration in FIG. 5.

The UE may first resolve overlapping PUCCHs and/or PUSCHs with the same priority, at 502. As a part of resolving the overlap for channels of the same priority level, at 502, the UE may first resolve overlapping PUCCHs of same priority to obtain, at 506, one final PUCCH for a given priority. For example, in the example 600 in FIG. 6, the UE may first resolve the overlap between the HP PUCCH 1 and the HP PUCCH 2 on CC1 in order to obtain a single HP PUCCH on CC1. For example, the UE may multiplex the two HP PUCCHs. The examples 620, 630, and 640 do not include PUCCH of the same priority, and the UE may proceed past the consideration in 506.

After resolving the overlap between PUCCHs of the same priority level, at 506, the UE may resolve the overlap in time between PUCCH (e.g., the single PUCCH left after resolving the overlapping PUCCHs of the same priority level) and PUSCH(s) of the same priority, at 508.

If the overlapping channels (e.g., PUCCH and PUSCH) are of the same priority, at 514, the UE may determine whether the PUCCH and PUSCH of a high priority level (if scheduled to overlap) can be transmitted simultaneously. For example, if the UE supports simultaneous transmission of the PUCCH and the PUSCH, and/or has been configured for the simultaneous transmission, then the UE may perform simultaneous PUCCH/PUSCH transmission. In addition to capability and configuration, e.g., such as shown at 1806 and 1808. the UE may consider, or take into account, one or more additional factors when making a selection between simultaneous transmission of the PUCCH/PUSCH and multiplexing the PUCCH and PUSCH. If the UE determines not to simultaneously transmit the PUCCH and PUSCH, the UE may piggyback (e.g., multiplex) the PUCCH (e.g., such as UCI) on a PUSCH of the same priority, at 516. In the example 600 in FIG. 6, the UE may transmit the HP PUCCH (after resolving the overlap between HP PUCCH 1 and HP PUCCH 2) on CC1 and simultaneously transmit the HP PUSCH on CC2 based on supporting, and/or being configured for, simultaneous transmission of PUCCH and PUSCH. Otherwise, the UE may multiplex the HP PUCCH in the HP PUSCH on CC2.

As illustrated at 518, the UE may determine whether the PUCCH and the PUSCH of a low priority (if scheduled to overlap) can be transmitted simultaneously. For example, if the UE supports simultaneous transmission of the PUCCH and the PUSCH, and/or has been configured for the simultaneous transmission, then the UE may perform simultaneous LP PUCCH/PUSCH transmission. Otherwise, the UE may piggyback (e.g., multiplex) the UCI on the PUSCH of the same (e.g., low) priority, at 520. The UE may perform the simultaneous transmission, e.g., at 514 or 520, if the remaining overlapping channels have the same priority level. However, if there overlapping channels of different priority levels have not yet been resolved, then, as a part of resolving the overlap between PUCCH and PUSCH(s) of the same priority level, at 508, the UE may multiplex the PUCCH with a PUSCH of the same priority level, e.g., at 516 and/or 518. In the example 620, the UE multiplexes the LP PUCCH and LP PUSCH on CC1 (e.g., 520), and the HP PUCCH on HP PUSCH on CC2 (e.g., 516), as a part of resolving the overlap at 508. Similarly, in the example 630, the UE may multiplex the HP PUCCH with the HP PUSCH on CC2, e.g., as part of the resolving at 508.

In the examples 620, 630, and 640 in FIG. 6, there remain PUCCH/PUSCH with different priority levels, and the UE may proceed from 506 to resolve overlapping PUCCH(s) and PUSCH(s) of different priority levels, at 504.

At 510, the UE may first resolve an overlap in time between PUCCHs of different priority levels (e.g., HP PUCCH and LP PUCCH). In some aspects, to resolve the overlap between the PUCCHs, the UE may drop a lower priority PUCCH, at 522. In some aspects, the UE may multiplex a LP/HP PUCCH transmission, at 524. The resolving may lead to a single PUCCH transmission (whether due to dropping, e.g., at 526, or multiplexing.

After resolving the overlap between the PUCCH(s) of different priorities, at 510, the UE may proceed to resolve the overlap between the remaining PUCCH and the PUSCH of different priorities, if any, at 512. As part of the resolving, at 512, the UE may determine whether the remaining PUCCH and PUSCH(s) can be transmitted simultaneously. For example, if the UE supports simultaneous transmission of the PUCCH and the PUSCH, and/or has been configured for the simultaneous transmission, then the UE may perform the simultaneous transmission, at 528. In addition to capability and configuration, the UE may consider, or take into account, one or more additional factors when making a selection between simultaneous transmission of the PUCCH/PUSCH and multiplexing the PUCCH and PUSCH. Otherwise, the UE may piggyback (e.g., multiplex) the UCI on the PUSCH, at 530, or may drop the lower priority channel transmission, e.g., at 528. In the example 620, the UE may transmit the LP PUSCH multiplexed with the LP PUCCH on CC1 and simultaneously transmit the HP PUSCH multiplexed with the HP UCI on CC2, if supported, configured and/or enabled. Otherwise, the UE may multiplex the two transmissions or may drop one of the transmissions. Similarly, in the example 630, the UE may transmit the LP HARQ-ACK on CC1 simultaneously with the HP PUSCH multiplexed with the HP PUCCH on CC2, if simultaneous PUSCH/PUCCH transmission is supported, configured and/or enabled for the UE. The example 640 illustrates an example in which the UE may multiplex the different priority level PUCCH with the multiplexed HP PUSCH and HP PUCCH in CC1, e.g., as there is no LP PUSCH for the LP PUCCH to be multiplexed with.

Figure 7:
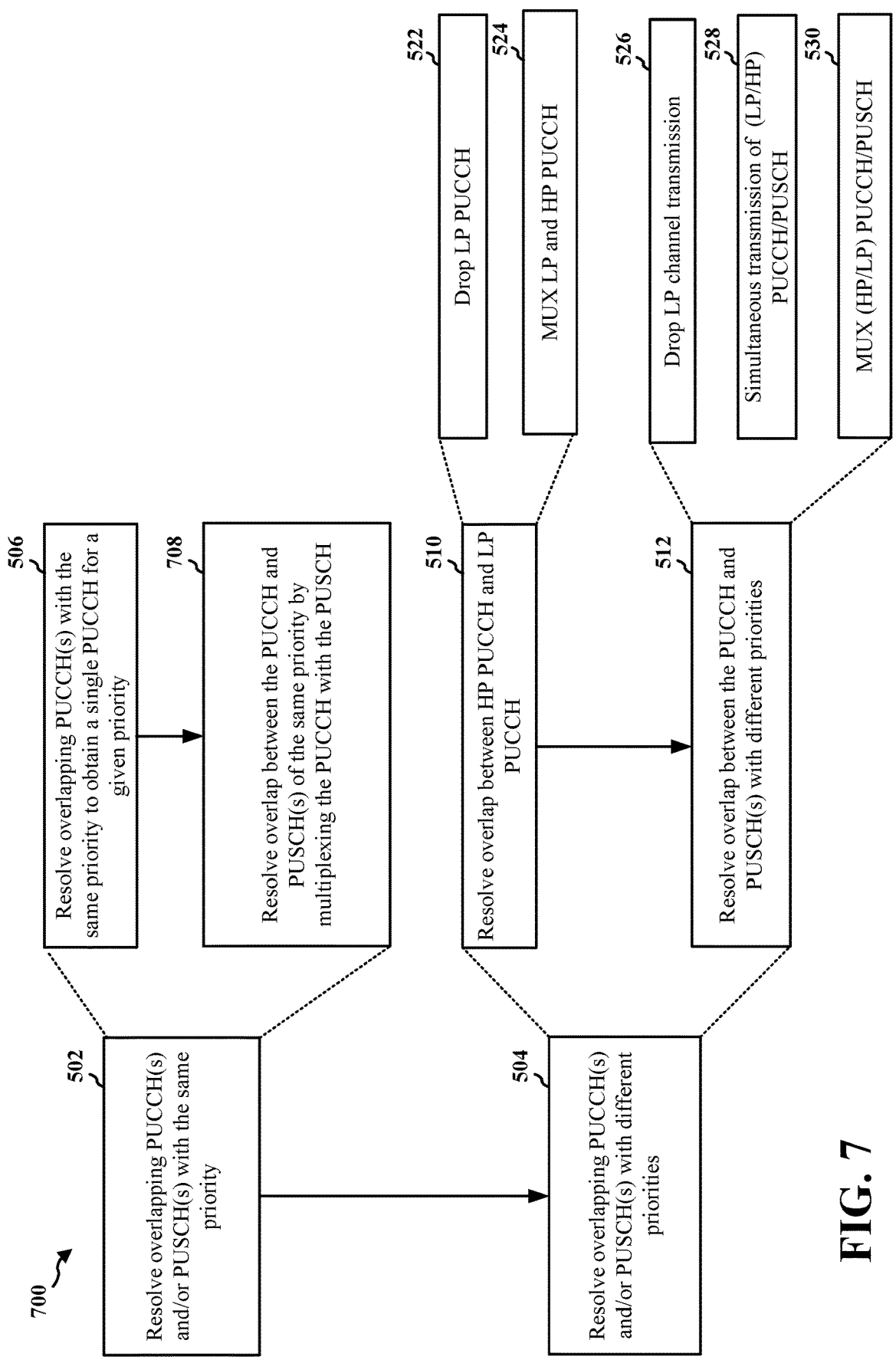
FIG. 7 illustrates an example framework or process for resolving various scenarios of overlapping PUCCH and PUSCH messages, in accordance with aspects presented herein.

In some aspects, various considerations illustrated in FIG. 5 may be turned off, disabled, or skipped, which modify the way in which the UE resolves the overlapping channels. As an example, FIG. 7 illustrates an example of aspects of considerations 700 that may be performed by the UE to resolve overlaps between multiple PUCCH and PUSCH transmissions. The considerations that are the same between FIG. 5 and FIG. 7 are illustrated with a same reference number. In contrast to FIG. 5, FIG. 7 may not include 514, 516, 518, and 520. Instead, at 708, the UE may piggy back, or multiplex PUCCH that overlaps with PUSCH(s) of the same priority level, e.g., without considering whether to perform simultaneous transmission of the PUCCH and the PUSCH of the same priority level. The example in FIG. 7 may include the simultaneous transmission PUSCH/PUCCH of different priorities, but does not provide for the simultaneous transmission of PUCCH and PUSCH with a same priority level.

Figure 8:
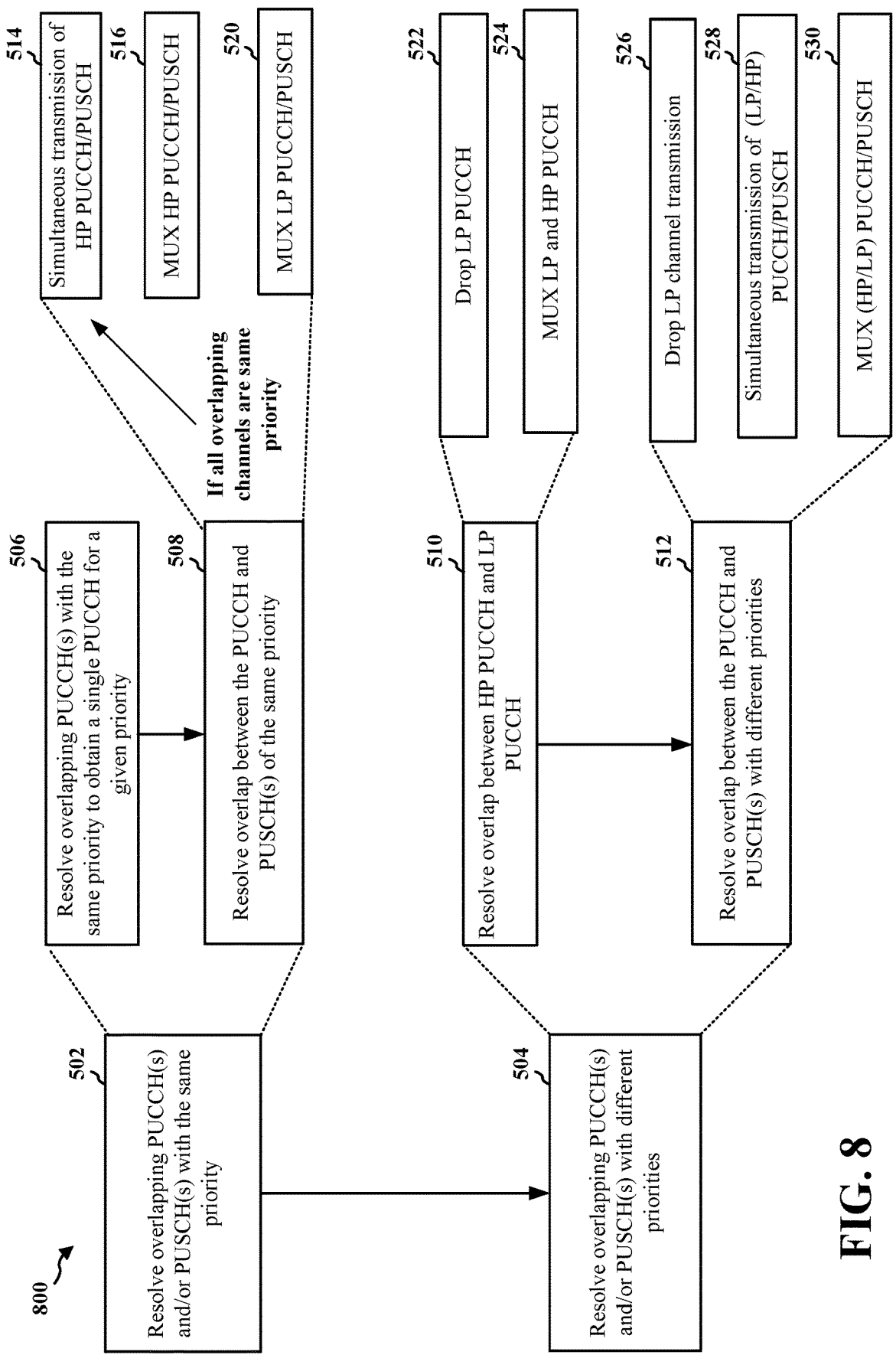
FIG. 8 illustrates an example framework or process for resolving various scenarios of overlapping PUCCH and PUSCH messages, in accordance with aspects presented herein.

As another example, FIG. 8 illustrates an example of aspects of considerations 800 that may be performed by the UE to resolve overlaps between multiple PUCCH and PUSCH transmissions. The considerations that are the same between FIG. 5 and FIG. 8 are illustrated with a same reference number. In contrast to FIG. 5, FIG. 8 may not include 518. Instead, the UE may piggy back, or multiplex lower priority PUCCH that overlaps with lower priority PUSCH(s), e.g., without considering whether to perform simultaneous transmission of the PUCCH and the PUSCH of the same priority level. The example in FIG. 8 may include the simultaneous transmission of high priority PUSCH/PUCCH or of PUSCH/PUCCH of different priorities, but does not provide for the simultaneous transmission of LP PUCCH and LP PUSCH.

Figures 9A, 9B:
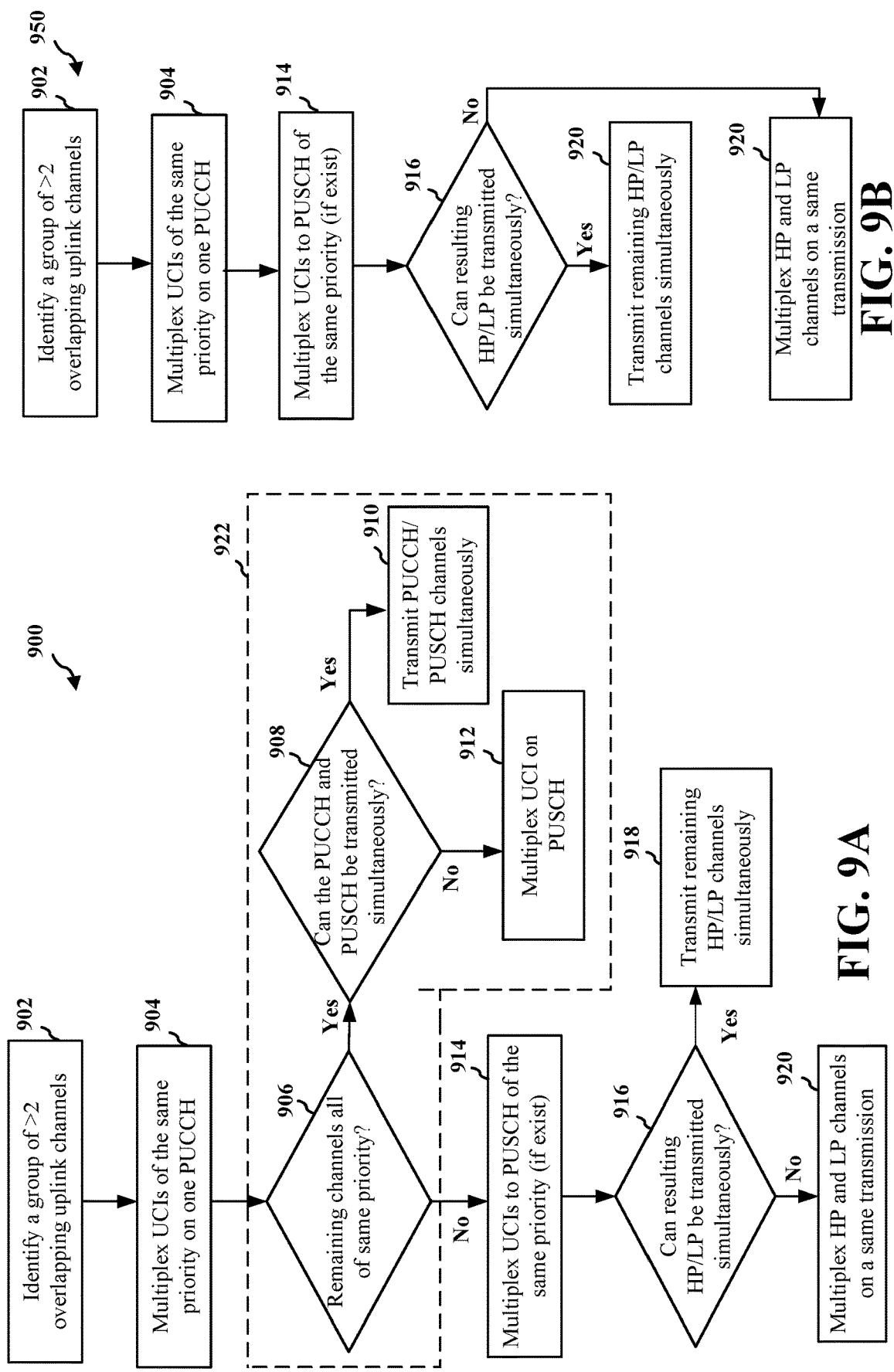
FIG. 9A and FIG. 9B illustrate example flowcharts of methods of wireless communication including resolving overlapping PUCCH and PUSCH messages, in accordance with aspects presented herein.

FIG. 9A illustrates an example flowchart 900 of a method of wireless communication including an order of consideration for overlapping PUCCH(s) and PUSCH(s). At 902, the UE may identify a group of more than two overlapping uplink channels. FIGS. 4 and 6 illustrate various examples of three or more uplink channels that are scheduled to overlap in time, e.g., on different CCs. At 904, the UE may multiplex UCIs of the same priority on a single PUCCH. The resolving at 506 in FIGS. 5, 7, and/or 8 may correspond to 904. After resolving the PUCCHs of the same priority level, the UE may determine whether the remaining channels are each of a same priority level, at 906. If the remaining channels have different priority levels, the UE may multiplex PUCCH and PUSCH having a same priority level, at 914. Then, at 916, the UE may consider whether the resulting channels of different priority level, e.g., HP and LP PUCCH/PUSCH can be transmitted simultaneously. The consideration may be similar to 528 in FIGS. 5, 7, and 8. If the UE supports simultaneous transmission, and/or is configured for simultaneous transmission, the UE may transmit the PUCCH and PUSCH of different priority levels simultaneously at 918. If the UE does not support simultaneous transmission, and/or has not been configured for simultaneous transmission, the UE may multiplex the LP and HP channels on a same transmission, at 920 (e.g., similar to 530 in FIG. 5). In addition to capability and configuration for simultaneous PUCCH/PUSCH transmission, the UE may consider, or take into account, one or more additional factors when making a selection between simultaneous transmission of the PUCCH/PUSCH and multiplexing the PUCCH and PUSCH.

If the remaining channels are the same priority, as determined at 906, the UE may consider whether the PUCCH and PUSCH can be transmitted simultaneously, at 908. The determination may correspond to the consideration in connection with 514 and/or 516 in FIGS. 5 and 8. The consideration may be performed for either HP PUSCH/PUCCH and LP PUSCH/PUCCH, e.g., as illustrated in FIG. 5. In some aspects, the UE may perform the determination for channels of a particular priority level, e.g., for the higher priority level but not the lower priority level, e.g., as illustrated in FIG. 8. For example, for lower priority PUCCH/PUSCH, the UE may determine that the transmissions are to be multiplexed, at 912, even if the UE supports simultaneous transmission. If the PUCCH/PUSCH of the same priority level may be transmitted simultaneously, e.g., based on support of the UE for simultaneous PUCCH and PUSCH transmission and/or a configuration of the UE, the UE may transmit the PUSCH and PUCCH transmissions simultaneously, at 910. Otherwise, the UE may multiplex the PUCCH with the PUSCH, at 912. One or more of the considerations may be moved in order or skipped. The line 922, for example, shows the considerations that may be removed in order to correspond to the example in FIG. 7. For example, FIG. 9B illustrates an example flowchart 950 showing the aspects of FIG. 9A without the considerations at 922.

Figure 10:
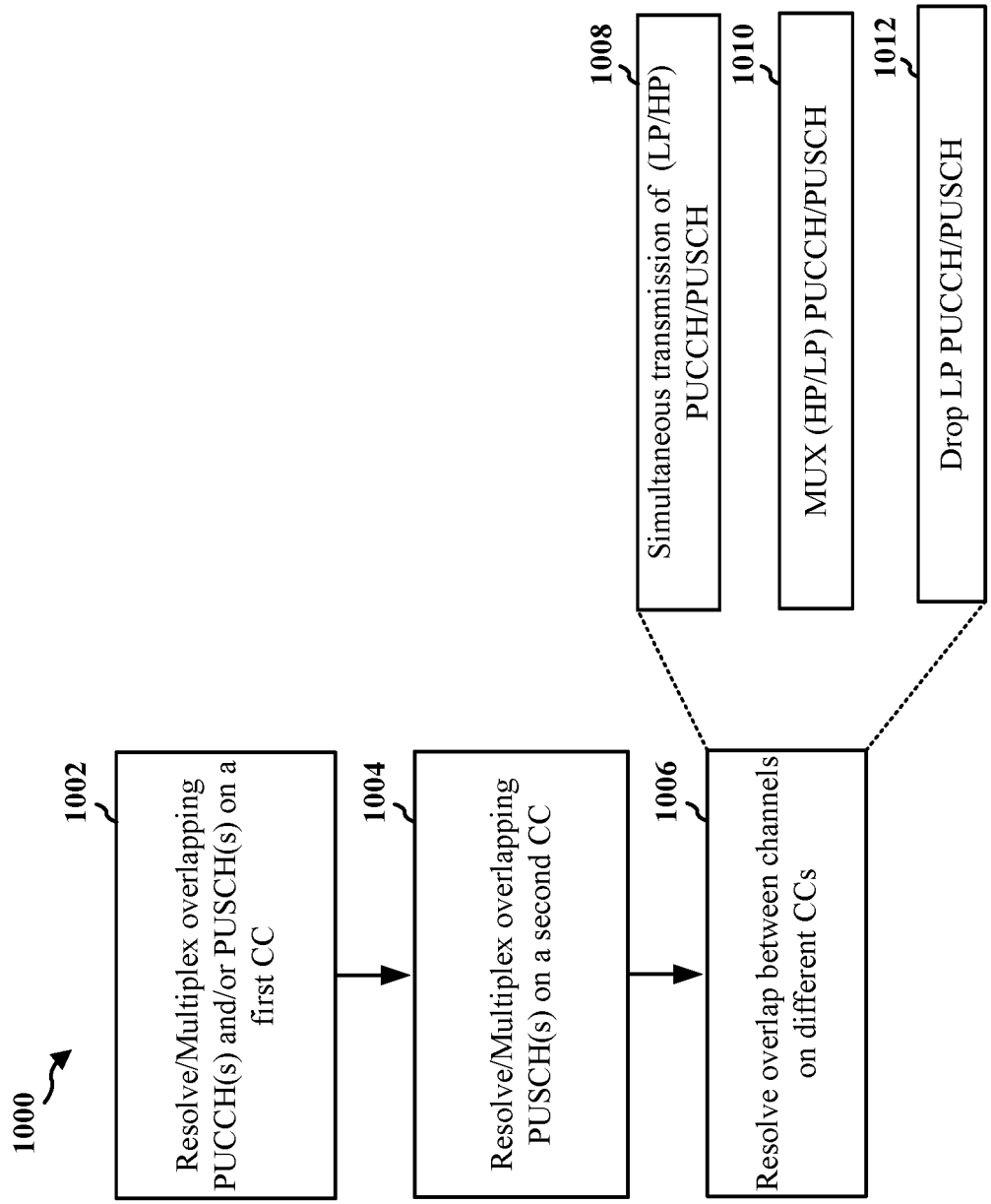
FIG. 10 illustrates an example framework or process for resolving various scenarios of overlapping PUCCH and PUSCH messages, in accordance with aspects presented herein.

In some aspects, the UE may resolve overlapping PUCCH and PUSCH transmissions in per cell/per CC grouping manner. In such aspects, the UE may first resolve PUCCH/PUSCH transmissions that overlap in time within a CC, e.g., for each CC separately, before resolving collisions across different CCs. FIG. 10 illustrates an example method 1000 of a UE resolving PUCCH and PUSCH transmissions that overlap in time. As the overlapping PUSCH/PUCCH are resolved per cell or CC, the channels scheduled on the same CC may be multiplexed together. Although the example in FIG. 10 is described for a first CC and a second CC, the aspects may be similar applied for a first cell and a second cell. The UE may receive control signaling that indicates that the UE is scheduled to transmit one or more uplink control channel messages on a first component carrier that overlap in a time domain with one or more uplink shared channel messages scheduled for transmission on a second component carrier. As an example, at 1002, the UE may resolve overlapping PUCCH(s) and/or PUSCH(s) on a first CC by multiplexing the overlapping PUCCH(s) and/or PUSCH(s). For example, the UE may multiplex overlapping transmissions per component carrier for the first component carrier and the second component carrier. In some examples, at 1002, the UE may resolve overlapping PUCCH(s) and/or PUSCH(s) on a first CC by dropping a lower priority transmission. Then, at 1004, the UE may resolve overlapping PUSCHs, if there are multiple PUSCH transmissions scheduled on the second CC. For example, the UE may multiplex multiple PUSCHs into a single PUSCH transmission for the second CC. PUCCH may be scheduled in one of the CCs. The CC in which the PUCCH is scheduled may be referred to as the PUCCH cell, and other cells may be referred to as non-PUCCH cells, for example. On the PUCCH CC (which may correspond to a PUCCH cell), there will be either one PUCCH or PUSCH left after resolving the overlapping, at 1002. On the non-PUCCH CC(s) (which may be correspond to non-PUCCH cell(s)), there will be at most one PUSCH on each non-PUCCH CC, e.g., after 1004. If there are more than two CCs, the UE may perform a similar action as 1004 for each of the non-PUCCH CCs.

At 1006, the UE may resolve the overlap between channels on different CCs. For example, if the resulting PUCCH/PUSCH(s) on different CCs can be transmitted simultaneously (e.g., based on the UE's support and/or a configuration from the base station), then the UE may transmit the PUSCH/PUCCHs transmissions simultaneously on corresponding CCs, e.g., at 1008. At 1008, the UE may transmit a first uplink message on the first component carrier and a second uplink message on the second component carrier that overlap in the time domain, if a condition is satisfied, the first uplink message comprising the one or more uplink control channel message and the second uplink message comprising one or more uplink shared channel messages after the multiplexing. The condition may be based, at least in part, on one or more of: a capability of the UE that supports simultaneous PUCCH and PUSCH transmission on different component carriers, or an enablement of the simultaneous PUCCH and PUSCH transmission on the different component carriers.

If the simultaneous transmission of PUSCH/PUCCH on different CCs is not supported or enabled, the UE may piggyback (e.g., multiplex) PUCCH with a PUSCH on a different channel, at 1010. As an example, the UE may transmit a single, multiplexed message comprising the first uplink message and the second uplink message, if the condition is not satisfied.

In some aspects, the UE may drop a lower priority channel transmission rather than multiplex or piggyback the PUCCH with the PUSCH on a different channel, at 1012.

Figure 11:
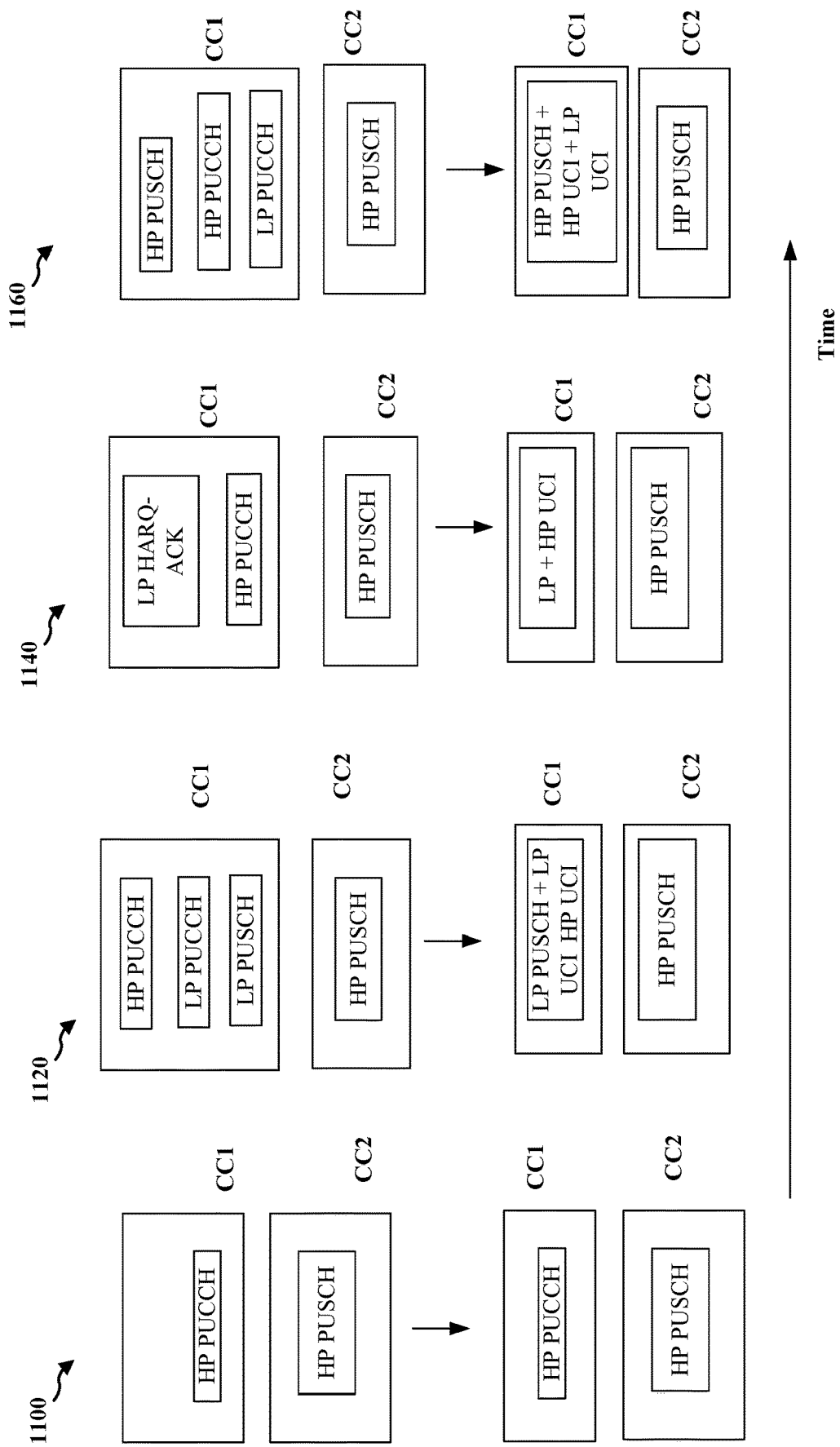
FIG. 11 illustrates example aspects of resolving various scenarios of overlapping PUCCH and PUSCH messages, in accordance with aspects presented herein.

FIG. 11 illustrates various examples of overlapping transmissions and the way in which the UE may resolve overlaps with the order of consideration in FIG. 10. The example 1100 is similar to the example 600 in FIG. 6, and the method of FIG. 10 provides a similar result to the methods of FIGS. 5, 7, 8, and 9 for FIG. 6. In the example 1100, there is no overlap within individual CCs to be resolved, so the UE transmits the HP PUCCH on CC1 simultaneously with the HP PUSCH on CC2, if simultaneous transmission is supported and/or configured. Otherwise, the UE may multiplex the PUCCH with the PUSCH on CC2 for a single transmission on CC2. In the example 1120, the UE may first resolve (e.g., multiplex) the overlapping transmissions in CC1 before considering the overlap in CC2. Therefore, the UE may multiplex both the LP and HP PUCCH with the LP PUSCH in CC1 before considering the overlap between the LP PUSCH+LP PUCCH+HP PUCCH on CC1 and the HP PUSCH on CC2, e.g., simultaneous transmission of the transmissions on CC1 and CC2, if supported/configured and otherwise multiplexing the two transmissions. This provides a different result than 620 in FIG. 6. In the example 1140 and 1160, the UE first multiplexes the overlapping PUCCH in CC1 before considering the overlapping HP PUSCH on CC2, e.g., simultaneous transmission of the transmissions on CC1 and CC2, if supported/configured and otherwise multiplexing the two transmissions.

Figure 12:
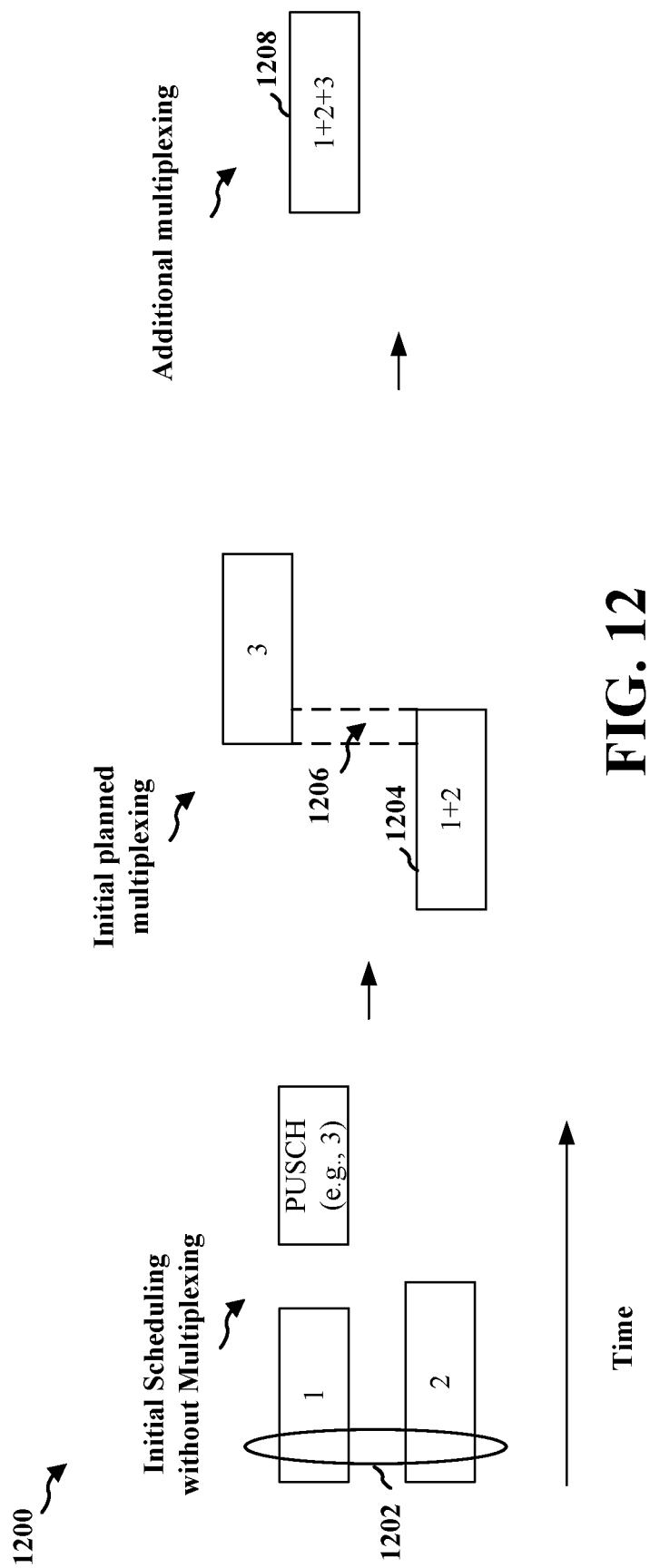
FIG. 12 illustrates example aspects of resolving various scenarios of overlapping PUCCH and PUSCH messages, in accordance with aspects presented herein.

FIG. 12 illustrates an example time diagram 1200 for sequential collision resolution. In some aspects, a pseudo code may define groups of overlapping channels, and may include intermediate steps for solving collisions within/ across groups. The intermediate collision handing may be referred to or may include intermediate multiplexing. FIG. 12 illustrates that there may be a first overlap that will occur between transmissions 1 and 2, but not transmission 3, and the UE may resolve, at 1202, the overlap between transmission 1 and transmission 2 by multiplexing the transmissions to form a single transmission of 1+2, e.g., 1204. As shown at the initial planned multiplexing stage, the multiplexed resources for 1+2 would overlap, at 1206, in time with transmission 3. Therefore, the UE may further multiplex the transmission 3 into the transmission 1+2 to form a multiplexed transmission of 1+2+3, e.g., 1208.

A simultaneous PUCCH/PUSCH capable UE, may perform the considerations described in connection with any of FIGS. 5-11 without intermediate multiplexing.

As an example, for the method of FIG. 5, 7, or 8, if there is at least one PUSCH involved in the collision, some UCI may be moved to, e.g., multiplexed with the PUSCH, e.g., without a separate intermediate multiplexing to mux PUSCH+PUSCH or PUSCH+PUCCH As another example, the method of FIG. 10 may allow for intermediate multiplexing in the PUCCH cell. However, after solving the collisions within the PUCCH cell, the overlapping PUCCH/PUSCH transmissions may be resolved without intermediate multiplexing.

Figure 13:
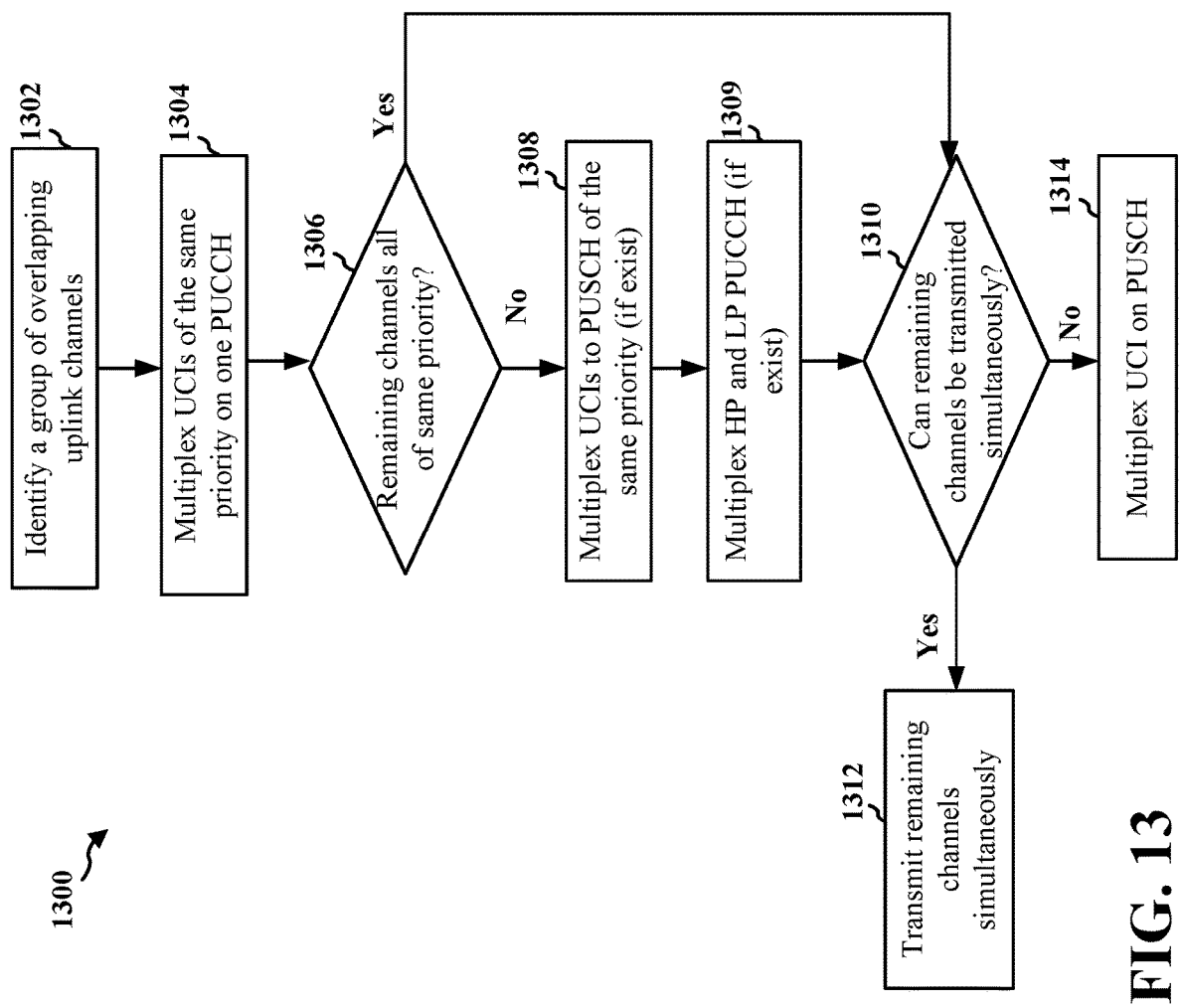
FIG. 13 illustrates an example flowchart of a method of wireless communication including resolving overlapping PUCCH and PUSCH messages, in accordance with aspects presented herein.

FIG. 13 illustrates an example flowchart 1300 of a method of wireless communication including an order of consideration for overlapping PUCCH(s) and PUSCH(s). At 1302, the UE may identify a group of more than two overlapping uplink channels. FIGS. 4 and 6 illustrate various examples of 3 or more uplink channels that are scheduled to overlap in time, e.g., on different CCs. At 1304, the UE may multiplex UCIs of the same priority on a single PUCCH. The resolving at 506 in FIGS. 5, 7, and/or 8 may correspond to 1304. After resolving the PUCCHs of the same priority level, the UE may determine whether the remaining channels are each of a same priority level, at 1306. If the remaining channels have different priority levels, the UE may multiplex PUCCH and PUSCH having a same priority level, at 1308. For example, multiplexing HP PUCCH and PUSCH and/or multiplexing LP PUCCH and PUSCH is described in connection with 516 and 520, as part of resolving the overlap between PUSCH and PUSCH(s) of the same priority, at 508, in FIG. 5. At 1309, the UE may resolve PUCCH of different priority levels, such as by multiplexing PUCCH of different priority levels, at 1309. For example, the UE may multiplex HP PUCCH and LP PUCCH, e.g., if PUCCH of different priority levels are some of the overlapping uplink transmissions. The multiplexing, at 1309, may correspond to the multiplexing of LP PUCCH and HP PUCCH, at 524 in FIG. 5, 7, or 8, for example. Then, at 1310, the UE may consider whether the resulting channels of different priority level, e.g., HP and LP PUCCH/PUSCH can be transmitted simultaneously. The consideration may be similar to 528 in FIGS. 5, 7, and 8. If the UE supports simultaneous transmission, and/or is configured for simultaneous transmission, the UE may transmit the PUCCH and PUSCH of different priority levels simultaneously at 1312. If the UE does not support simultaneous transmission, and/or has not been configured for simultaneous transmission, the UE may multiplex the LP and HP channels on a same transmission, at 1314 (e.g., similar to 530 in FIG. 5). In addition to capability and configuration for simultaneous PUCCH/PUSCH transmission, the UE may consider, or take into account, one or more additional factors when making a selection between simultaneous transmission of the PUCCH/PUSCH and multiplexing the PUCCH and PUSCH.

If the remaining channels are the same priority, as determined at 1306, the UE may consider whether the PUCCH and PUSCH can be transmitted simultaneously, at 1310. The determination may correspond to the consideration in connection with 514 and/or 516 in FIGS. 5 and 8. The consideration may be performed for either HP PUSCH/PUCCH or LP PUSCH/PUCCH, e.g., as illustrated in FIG. 5. In some aspects, the UE may perform the determination for channels of a particular priority level, e.g., if the channels have the higher priority level but not the lower priority level, e.g., as illustrated in FIG. 8. For example, for lower priority PUCCH/PUSCH, the UE may determine that the transmissions are to be multiplexed, at 1314, even if the UE supports simultaneous transmission. If the PUCCH/PUSCH of the same priority level may be transmitted simultaneously, e.g., based on support of the UE for simultaneous PUCCH and PUSCH transmission and/or a configuration of the UE, the UE may transmit the PUSCH and PUCCH transmissions simultaneously, at 1312. Otherwise, the UE may multiplex the PUCCH with the PUSCH, at 1314.

Figure 14:
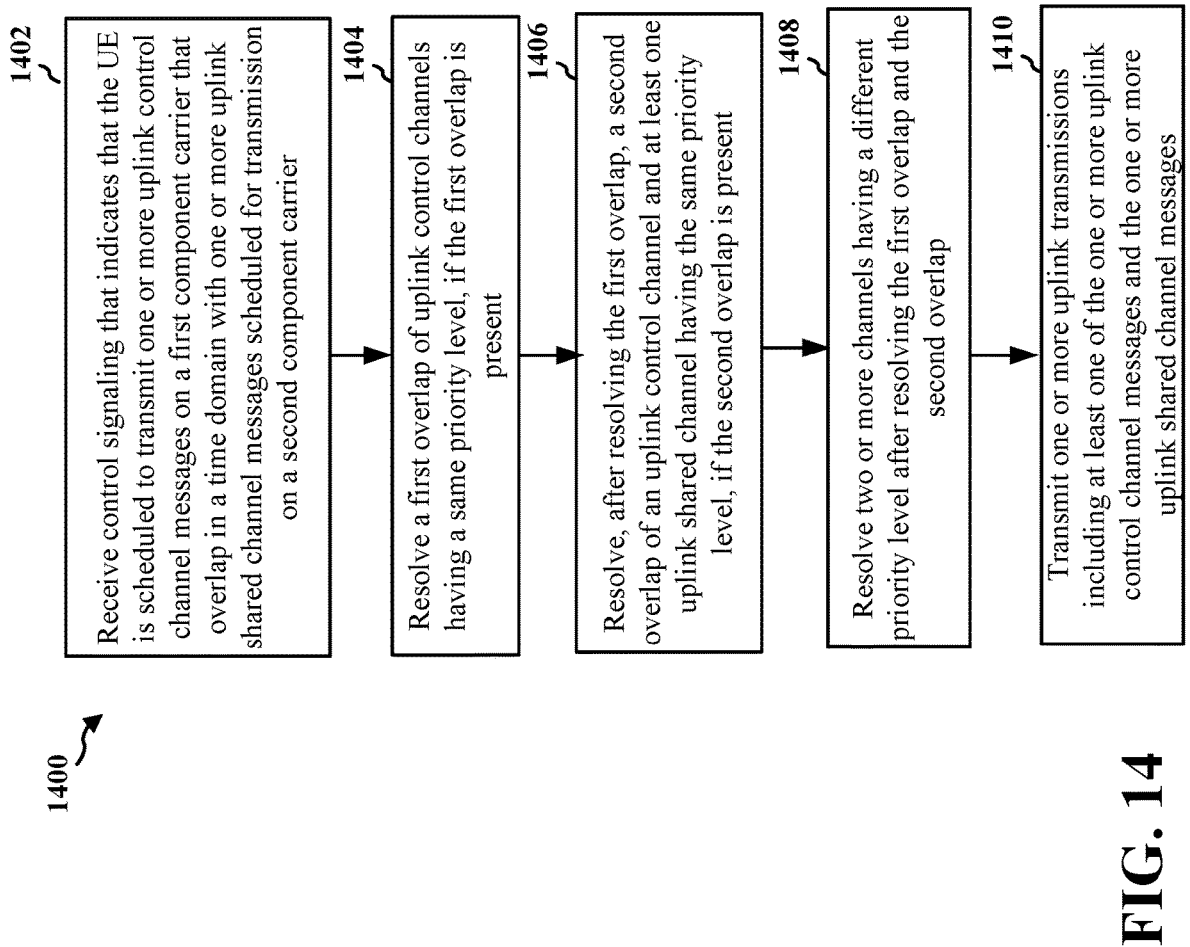
FIG. 14 illustrates an example flowchart of a method of wireless communication including resolving overlapping PUCCH and PUSCH messages, in accordance with aspects presented herein.

FIG. 14 is a flowchart 1400 of a method of wireless communication. The method may be performed by a UE (e.g., the UE 104, 350; the apparatus 1502). The method enables a UE to resolve multiple types of collisions in order to improve communication between a UE and a network.

At 1402, the UE receives control signaling that indicates that the UE is scheduled to transmit one or more uplink control channel messages that overlap in a time domain with one or more uplink shared channel messages scheduled for transmission. In some aspects, the one or more uplink control channel messages may be scheduled on a first component carrier, and the one or more uplink shared channel messages may be scheduled on a second component carrier. The reception may be performed, e.g., by one or more of the PUCCH/PUSCH component 198, the transceiver 1522, or the antenna 1580. FIGS. 4, 6, and 11 illustrate various examples of overlapping uplink transmissions that may be scheduled for the UE. FIG. 17 illustrates an example communication flow between a UE and a base station, aspects of which may be performed in connection with the method in FIG. 14.

At 1404, the UE resolves a first overlap of uplink control channels having a same priority level, if the first overlap is present. Resolving the first overlap may include multiplexing a first control channel and a second control channel of the same priority level. FIGS. 5, 7, 8, 9A, 9B, 10, 12, and 13 illustrate various examples of resolving such overlaps. The resolving may be performed, e.g., by the PUCCH/PUSCH component 198.

At 1406, the UE resolves, after resolving the first overlap, a second overlap of an uplink control channel and at least one uplink shared channel having the same priority level, if the second overlap is present. Resolving the second overlap may include multiplexing the uplink control channel and the at least one uplink shared channel having the same priority level. FIGS. 5, 7, 8, 9A, 9B, 10, 12, and 13 illustrate various examples of resolving such overlaps. The resolving may be performed, e.g., by the PUCCH/PUSCH component 198.

Resolving the second overlap may include transmitting a first uplink message and a second uplink message simultaneously (e.g., overlap in the time domain), if a condition is satisfied; and transmitting a single, multiplexed message comprising the first uplink message and the second uplink message, if the condition is not satisfied. The first uplink message may be on a first component carrier and the second uplink message may be on a second component carrier. The condition may be based on one or more of: a capability of the UE that supports simultaneous PUCCH and PUSCH transmission on different component carriers, an enablement of the simultaneous PUCCH and PUSCH transmission on the different component carriers, or a priority level of the uplink control channel and the at least one uplink shared channel having the same priority level. As an example, the UE may multiplex the uplink control channel and the at least one uplink shared channel having the same priority level if same priority level is a low priority level.

At 1408, the UE resolves two or more channels having a different priority level after resolving the first overlap and the second overlap. FIGS. 5, 7, 8, 9A, 9B, 10, 12, and 13 illustrate various examples of resolving an overlap between channels of different priority levels. The resolving may be performed, e.g., by the PUCCH/PUSCH component 198. Resolving the two or more channels having the different priority level may include resolving a third overlap of multiple uplink control channels of different priority levels, if the third overlap is present; and resolving a fourth overlap of the uplink control channel and an uplink shared channel of the different priority levels. Resolving the third overlap may include multiplexing a lower priority PUCCH with a higher priority PUCCH. Resolving the third overlap may include dropping a lower priority PUCCH transmission. Resolving the fourth overlap may include transmitting a first uplink message including the uplink control channel and a second uplink message including the uplink shared channel simultaneously (e.g., overlap in time), if a condition is satisfied; and transmitting a single, multiplexed message comprising the first uplink message and the second uplink message, if the condition is not satisfied. The first uplink message may be on a first component carrier and the second uplink message may be on a second component carrier. The condition may be based on one or more of: a capability of the UE that supports simultaneous PUCCH and PUSCH transmission on different component carriers, or an enablement of the simultaneous PUCCH and PUSCH transmission on the different component carriers.

At 1410, the UE transmits one or more uplink transmissions including at least one of the one or more uplink control channel messages and the one or more uplink shared channel messages. The transmission may include at least one PUSCH and/or a PUCCH. The transmission may be performed, e.g., by one or more of the PUCCH/PUSCH component 198, the transceiver 1522, or the antenna 1580.

Figure 15:
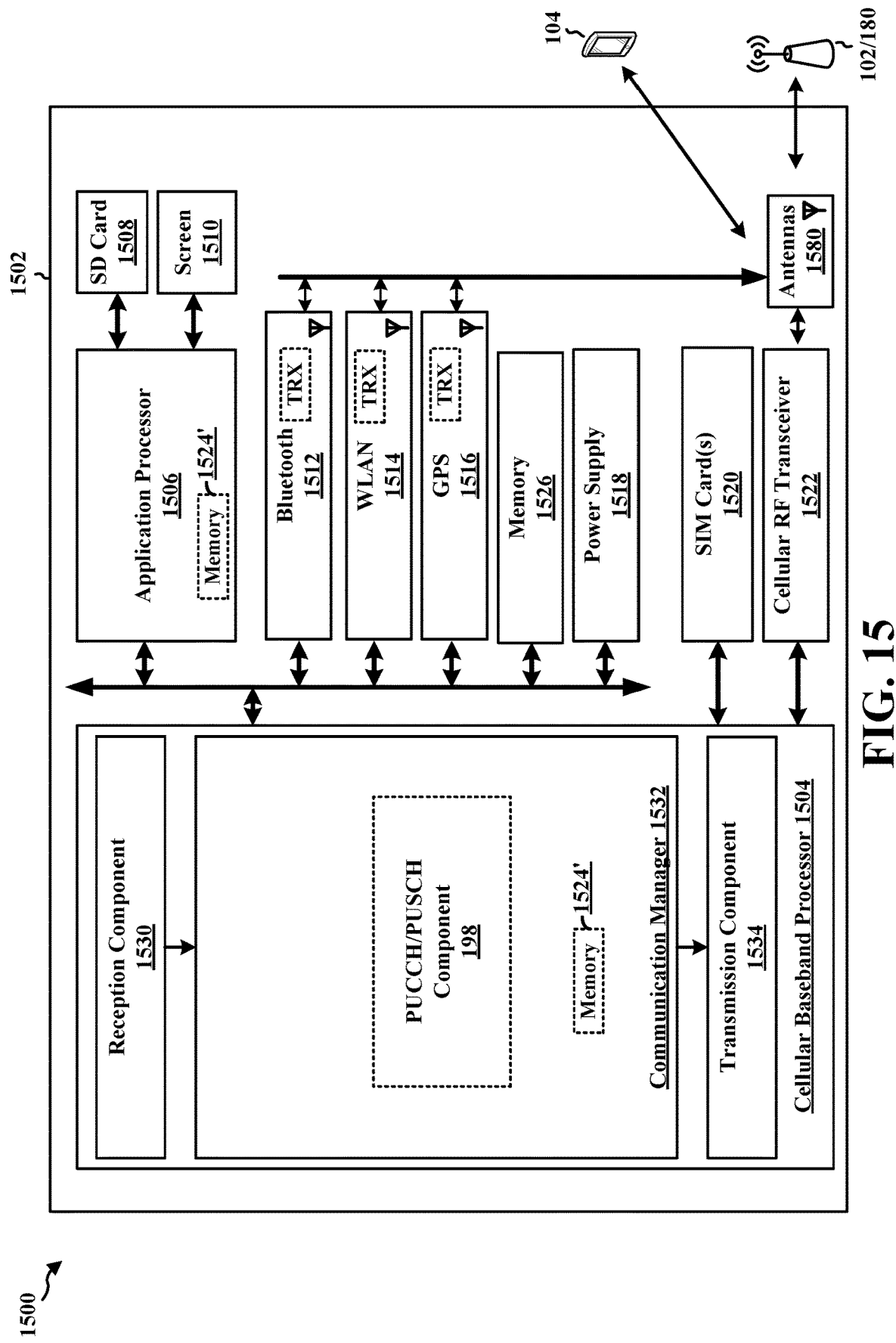
FIG. 15 is a diagram illustrating an example of a hardware implementation for an example apparatus configured to resolve overlapping PUCCH and PUSCH messages, in accordance with aspects presented herein.

FIG. 15 is a diagram 1500 illustrating an example of a hardware implementation for an apparatus 1502. The apparatus 1502 may be a UE, a component of a UE, or may implement UE functionality. In some aspects, the apparatus1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, a power supply 1518, or additional memory modules 1526. The cellular baseband processor 1504 communicates through one or more transceivers (e.g., the cellular RF transceiver 1522) with the UE 104 and/or BS 102/180. The cellular baseband processor 1504 may include on-chip memory 1524'. The Bluetooth module 1512, the WLAN module 1514, and the SPS module 1516 may include their own dedicated antennas and/or utilize the antennas 1580 for communication. The cellular baseband processor 1504 communicates through the transceiver(s) 1522 via one or more antennas 1580 with the UE 104 and/or with an RU associated with a network node such as a base station 102/180 or a component of the base station 102/180. The cellular baseband processor 1504 and the application processor 1506 may each include a computer-readable medium/memory 1524', respectively. The additional memory modules 1526 may also be considered a computer-readable medium/memory. Each computer-readable medium/memory 1524',1526 may be non-transitory. The cellular baseband processor 1504 and the application processor 1506 may each be responsible for general processing, including the execution of software stored on the computer-readable medium/memory. The software, when executed by the cellular baseband processor 1504/application processor 1506, causes the cellular baseband processor 1504/application processor 1506 to perform the various functions described supra. The computer-readable medium/memory may also be used for storing data that is manipulated by the cellular baseband processor 1504/application processor 1506 when executing software. The cellular baseband processor 1504 may further include a reception component 1530, a communication manager 1532, and a transmission component 1534. The communication manager 1532 and/or the application processor 1506 may include the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a PUCCH/PUSCH component 198 that is configured to resolve an overlap between two or more uplink transmissions, e.g., as described in connection with any of FIGS. 5-14 and 17. For example, in some aspects, the PUCCH/PUSCH component 198 may be configured to receive control signaling that indicates that the UE is scheduled to transmit one or more uplink control channel messages that overlap in a time domain with one or more uplink shared channel messages scheduled for transmission; resolve a first overlap of uplink control channels having a same priority level, if the first overlap is present; resolve, after resolving the first overlap, a second overlap of an uplink control channel and at least one uplink shared channel having the same priority level, if the second overlap is present; resolve two or more channels having a different priority level after resolving the first overlap and the second overlap; and transmit one or more uplink transmissions including at least one of the one or more uplink control channel messages and the one or more uplink shared channel messages. In some aspects, the PUCCH/PUSCH component 198 may be configured to receive control signaling that indicates that the UE is scheduled to transmit one or more uplink control channel messages on a first component carrier that overlap in a time domain with one or more uplink shared channel messages scheduled for transmission on a second component carrier;

multiplex overlapping transmissions per component carrier for the first component carrier and the second component carrier; transmit a first uplink message on the first component carrier and a second uplink message on the second component carrier that overlap in the time domain, if a condition is satisfied, the first uplink message comprising the one or more uplink control channel message and the second uplink message comprising one or more uplink shared channel messages after the multiplexing; and transmit a single, multiplexed message comprising the first uplink message and the second uplink message, if the condition is not satisfied.

The apparatus 1502 may include additional components that perform each of the blocks of the algorithm in the flowcharts of FIGS. 5, 7, 8, 9A, 9B, 10, 13, and/or 14. As such, each block in the flowcharts of FIGS. 5, 7, 8, 9A, 9B, 10, 13, and/or 14 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof As shown, the apparatus 1502 may include a variety of components configured for various functions. In one configuration, the apparatus 1502, and in particular the cellular baseband processor 1504, includes means for receiving control signaling that indicates that the UE is scheduled to transmit one or more uplink control channel messages that overlap in a time domain with one or more uplink shared channel messages scheduled for transmission; means for resolving a first overlap of uplink control channels having a same priority level, if the first overlap is present; means for resolving, after resolving the first overlap, a second overlap of an uplink control channel and at least one uplink shared channel having the same priority level, if the second overlap is present; means for resolving two or more channels having a different priority level after resolving the first overlap and the second overlap; and means for transmitting one or more uplink transmissions including at least one of the one or more uplink control channel messages and the one or more uplink shared channel messages. In some aspects, the apparatus 1302 may include means for receiving control signaling that indicates that the UE is scheduled to transmit one or more uplink control channel messages on a first component carrier that overlap in a time domain with one or more uplink shared channel messages scheduled for transmission on a second component carrier; means for multiplexing overlapping transmissions per component carrier for the first component carrier and the second component carrier; means for transmitting a first uplink message on the first component carrier and a second uplink message on the second component carrier that overlap in the time domain, if a condition is satisfied, the first uplink message comprising the one or more uplink control channel message and the second uplink message comprising one or more uplink shared channel messages after the multiplexing; and means for transmitting a single, multiplexed message comprising the first uplink message and the second uplink message, if the condition is not satisfied.

The apparatus 1502 may further include means for implementing the method of any of FIGS. 5, 7, 8, 9A, 9B, 10, 13, 14, and/or 17. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
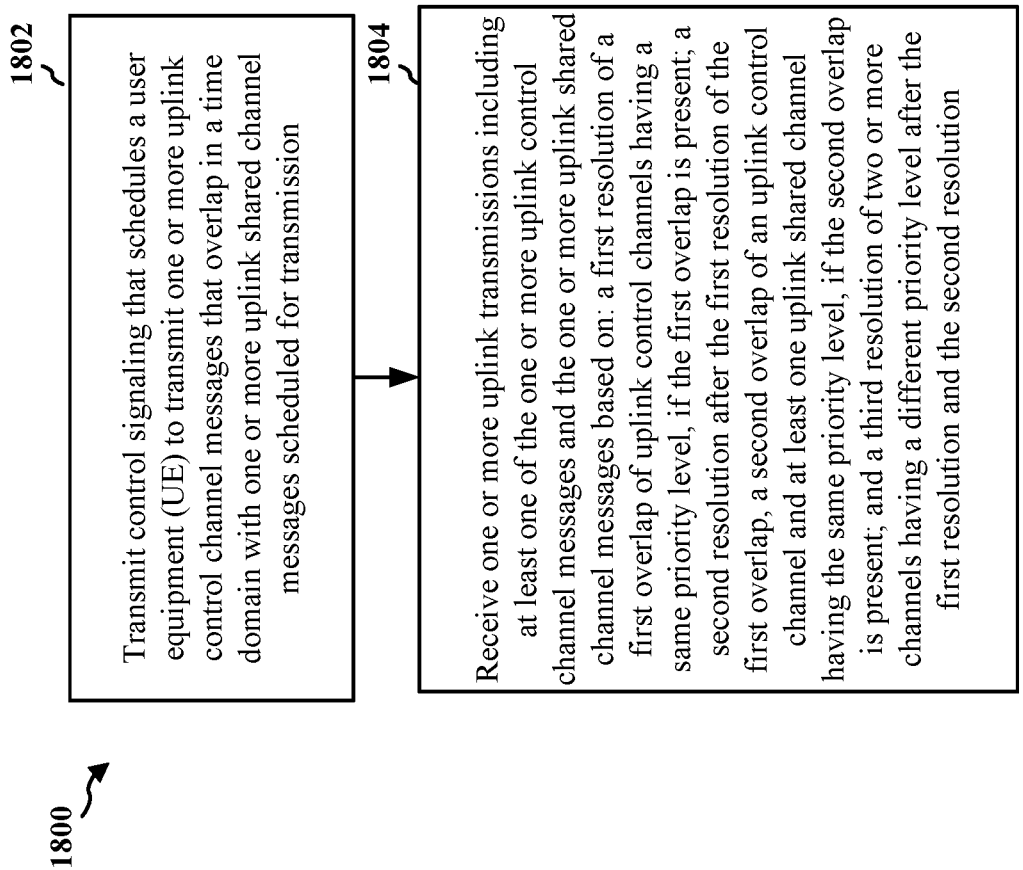
FIG. 18 illustrates an example flowchart of a method of wireless communication including resolution of overlapping PUCCH and PUSCH messages, in accordance with aspects presented herein.

FIG. 18 is a flowchart 1800 of a method of wireless communication. The method may be performed by a network node, which may be a base station or a component of a base station (e.g., the base station 102, 180, 310, 1704; CU 1610; DU 1630; RU 1640; the network entity 1902).

At 1802, the network node transmits control signaling scheduling a UE to transmit one or more uplink control channel messages that overlap in a time domain with one or more uplink shared channel messages scheduled for transmission. In some aspects, the one or more control channel messages may be scheduled for transmission on a first component carrier and the one or more uplink shared channel messages may be scheduled on a second component carrier. The transmission may be performed, e.g., by the PUCCH/PUSCH component 199. FIGS. 4, 6, and 11 illustrate various examples of overlapping uplink transmissions that may be scheduled for the UE. FIG. 17 illustrates an example communication flow between a UE and a base station, aspects of which may be performed in connection with the method in FIG. 18.

At 1804, the network node receives one or more uplink transmissions including at least one of the one or more uplink control channel messages and the one or more uplink shared channel messages based on one or more resolutions that the network node determines will be performed at the UE. The one or more uplink transmissions may include at least one PUSCH and/or a PUCCH. The reception may be performed, e.g., by the PUCCH/PUSCH component 199.

For example, a first resolution may resolve a first overlap of uplink control channels having a same priority level, if the first overlap is present. Resolving the first overlap may include multiplexing a first control channel and a second control channel of the same priority level. FIGS. 5, 7, 8, 9A, 9B, 10, 12, and 13 illustrate various examples of resolving such overlaps. The resolution may be determined, e.g., by the PUCCH/PUSCH component 199.

A second resolution, after the first resolution of the first overlap, may resolve a second overlap of an uplink control channel and at least one uplink shared channel having the same priority level, if the second overlap is present. Resolving the second overlap may include multiplexing the uplink control channel and the at least one uplink shared channel having the same priority level. FIGS. 5, 7, 8, 9A, 9B, 10, 12, and 13 illustrate various examples of resolving such overlaps. The resolution may be determined, e.g., by the PUCCH/PUSCH component 199.

A resolution of the second overlap may include reception of a first uplink message, e.g., including the uplink control channel, and a second uplink message, e.g., including the uplink shared channel, simultaneously, if a condition is satisfied; and reception of a single, multiplexed message comprising the first uplink message and the second uplink message, if the condition is not satisfied. The condition may be based on one or more of: a capability of the UE that supports simultaneous PUCCH and PUSCH transmission on different component carriers, an enablement of the simultaneous PUCCH and PUSCH transmission on the different component carriers, or a priority level of the uplink control channel and the at least one uplink shared channel having the same priority level. As an example, the uplink control channel may be multiplexed with the at least one uplink shared channel having the same priority level if the same priority level is a low priority level.

The two or more channels having a different priority level may be resolved after a resolution of the first overlap and the second overlap. FIGS. 5, 7, 8, 9A, 9B, 10, 12, and 13 illustrate various examples of resolving an overlap between channels of different priority levels. The resolving may be performed, e.g., by the PUCCH/PUSCH component 199. The third resolution of the two or more channels having the different priority level may include resolving a third overlap of multiple uplink control channels of different priority levels, if the third overlap is present; and resolving a fourth overlap of the uplink control channel and an uplink shared channel of the different priority levels. Resolving the third overlap may include multiplexing a lower priority PUCCH with a higher priority PUCCH. Resolving the third overlap may include dropping a lower priority PUCCH transmission. Resolving the fourth overlap may include transmitting a first uplink message on the first component carrier and a second uplink message on the second component carrier that overlap in the time domain, if a condition is satisfied; and transmitting a single, multiplexed message comprising the first uplink message and the second uplink message, if the condition is not satisfied. The condition may be based on one or more of: a capability of the UE that supports simultaneous PUCCH and PUSCH transmission on different component carriers, or an enablement of the simultaneous PUCCH and PUSCH transmission on the different component carriers.

Figure 19:
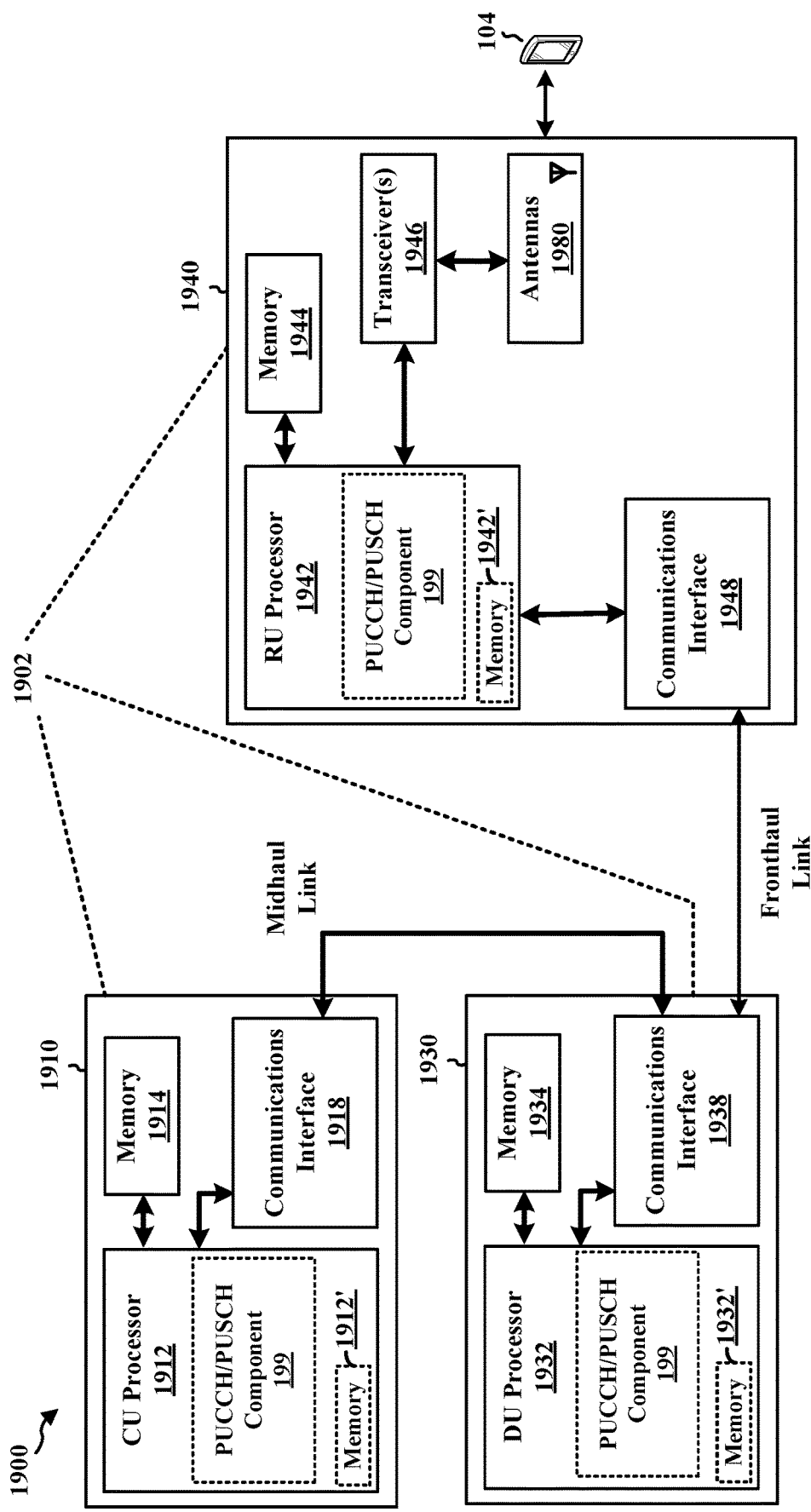
FIG. 19 is a diagram illustrating an example of a hardware implementation for an example apparatus configured to resolve overlapping PUCCH and PUSCH messages, in accordance with aspects presented herein.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the PUCCH/PUSCH component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912',1932',1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PUCCH/PUSCH component 199 is configured to transmit control signaling that schedules a UE to transmit one or more uplink control channel messages that overlap in a time domain with one or more uplink shared channel messages scheduled for transmission and to receive one or more uplink transmissions including at least one of the one or more uplink control channel messages and the one or more uplink shared channel messages based on: a first resolution of a first overlap of uplink control channels having a same priority level, if the first overlap is present; a second resolution after the first resolution of the first overlap, a second overlap of an uplink control channel and at least one uplink shared channel having the same priority level, if the second overlap is present; and a third resolution of two or more channels having a different priority level after the first resolution and the second resolution. The PUCCH/PUSCH component 199 may be further configured to perform any of the aspects described in connection with FIG. 18 or performed by the base station in FIG. 17. The PUCCH/PUSCH component 199 may be within one or more processors of one or more of the CU 1910, DU 1930, and the RU 1940. The PUCCH/PUSCH component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 includes means for transmitting control signaling that schedules a UE to transmit one or more uplink control channel messages that overlap in a time domain with one or more uplink shared channel messages scheduled for transmission; and means for receiving one or more uplink transmissions including at least one of the one or more uplink control channel messages and the one or more uplink shared channel messages based on: a first resolution of a first overlap of uplink control channels having a same priority level, if the first overlap is present; a second resolution after the first resolution of the first overlap, a second overlap of an uplink control channel and at least one uplink shared channel having the same priority level, if the second overlap is present; and a third resolution of two or more channels having a different priority level after the first resolution and the second resolution. The network entity may further include means to perform any of the aspects described in connection with FIG. 18 or performed by the base station in FIG. 17. The means may be the PUCCH/PUSCH component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving control signaling that indicates that the UE is scheduled to transmit one or more uplink control channel messages that overlap in a time domain with one or more uplink shared channel messages scheduled for transmission; resolving a first overlap of uplink control channels having a same priority level, if the first overlap is present; resolving, after resolving the first overlap, a second overlap of an uplink control channel and at least one uplink shared channel having the same priority level, if the second overlap is present; resolving two or more channels having a different priority level after resolving the first overlap and the second overlap; and transmitting one or more uplink transmissions including at least one of the one or more uplink control channel messages and the one or more uplink shared channel messages.

In aspect 2, the method of aspect 1 further includes that the control signaling schedules the one or more uplink control channel messages on a first component carrier and the one or more uplink shared channel messages are scheduled on a second component carrier.

In aspect 3, the method of aspect 1 or 2 further includes that the resolving the first overlap includes: multiplexing a first control channel and a second control channel of the same priority level.

In aspect 4, the method of any of aspects 1-3, further includes that the resolving the second overlap includes: transmitting a first uplink message including the uplink control channel and a second uplink message including the uplink shared channel simultaneously, if a condition is satisfied; and transmitting a single, multiplexed message comprising the first uplink message and the second uplink message, if the condition is not satisfied.

In aspect 5, the method of aspect 4 further includes that the condition is based on one or more of: a capability of the UE that supports simultaneous PUCCH and PUSCH transmission on different component carriers, an enablement of the simultaneous PUCCH and PUSCH transmission on the different component carriers, or a priority level of the uplink control channel and the at least one uplink shared channel having the same priority level.

In aspect 6, the method of aspect 4 or aspect 5 further includes that the UE multiplexes the uplink control channel and the at least one uplink shared channel having the same priority level if same priority level is a low priority level.

In aspect 7, the method of any of aspects 1-3 further includes that the resolving the second overlap includes: multiplexing the uplink control channel and the at least one uplink shared channel having the same priority level.

In aspect 8, the method of any of aspects 1-7 further includes that the resolving the two or more channels having the different priority level includes: resolving a third overlap of multiple uplink control channels of different priority levels, if the third overlap is present; and resolving a fourth overlap of the uplink control channel and an uplink shared channel of the different priority levels.

In aspect 9, the method of aspect 8 further includes that the resolving the third overlap includes: multiplexing a lower priority PUCCH with a higher priority PUCCH.

In aspect 10, the method of aspect 8 further includes that the resolving the third overlap includes: dropping a lower priority PUCCH transmission.

In aspect 11, the method of any of aspects 8-10 further includes that the fourth overlap includes: transmitting a first uplink message and a second uplink message simultaneously, if a condition is satisfied; and transmitting a single, multiplexed message comprising the first uplink message and the second uplink message, if the condition is not satisfied.

In aspect 12, the method of aspect 11 further includes that the condition is based on one or more of: a capability of the UE that supports simultaneous PUCCH and PUSCH transmission on different component carriers, or an enablement of the simultaneous PUCCH and PUSCH transmission on the different component carriers.

Aspect 13 is an apparatus for wireless communication at a UE, comprising means to perform the method of any of aspects 1 to 12.

In aspect 14, the apparatus of aspect 13 further comprising at least one antenna.

In aspect 15, the apparatus of aspect 13 or aspect 14 further comprising a transceiver.

Aspect 16 is an apparatus for wireless communication at a UE, comprising: memory; and at least one processor coupled to the memory, the memory and the at least one processor configured to implement the method of any of aspects 1 to 12.

In aspect 17, the apparatus of aspect 16, further comprising at least one antenna.

In aspect 18, the apparatus of aspect 16 or aspect 17, further comprising a transceiver.

Aspect 19 is a non-transitory computer-readable medium storing computer executable code for wireless communication at a UE, the code when executed by a processor causes the processor to implement the method of any of aspects 1 to 11.

Aspect 20 is a method of wireless communication at a UE, comprising: receiving control signaling that indicates that the UE is scheduled to transmit one or more uplink control channel messages on a first component carrier that overlap in a time domain with one or more uplink shared channel messages scheduled for transmission on a second component carrier; multiplexing overlapping transmissions per component carrier for the first component carrier and the second component carrier; transmitting a first uplink message on the first component carrier and a second uplink message on the second component carrier that overlap in the time domain, if a condition is satisfied, the first uplink message comprising the one or more uplink control channel message and the second uplink message comprising one or more uplink shared channel messages after the multiplexing; and transmitting a single, multiplexed message comprising the first uplink message and the second uplink message, if the condition is not satisfied.

In aspect 21 the method of aspect 20 further includes that the condition is based on one or more of: a capability of the UE that supports simultaneous PUCCH and PUSCH transmission on different component carriers, or an enablement of the simultaneous PUCCH and PUSCH transmission on the different component carriers.

Aspect 22 is an apparatus for wireless communication at a UE, comprising means to perform the method of aspect 20 or 21.

In aspect 23, the apparatus of aspect 22 further comprising at least one antenna.

In aspect 24, the apparatus of aspect 22 or aspect 23 further comprising a transceiver.

Aspect 25 is an apparatus for wireless communication at a UE, comprising: memory; and at least one processor coupled to the memory, the memory and the at least one processor configured to implement the method of aspect 20 or 21.

In aspect 26, the apparatus of aspect 25, further comprising at least one antenna.

In aspect 27, the apparatus of aspect 25 or aspect 26, further comprising a transceiver.

Aspect 28 is a non-transitory computer-readable medium storing computer executable code for wireless communication at a UE, the code when executed by a processor causes the processor to implement the method of aspect 20 or 21.

Aspect 29 is a method of wireless communication a at a network node, including transmitting control signaling that schedules a UE to transmit one or more uplink control channel messages that overlap in a time domain with one or more uplink shared channel messages scheduled for transmission; and receiving one or more uplink transmissions including at least one of the one or more uplink control channel messages and the one or more uplink shared channel messages based on: a first resolution of a first overlap of uplink control channels having a same priority level, if the first overlap is present; a second resolution after the first resolution of the first overlap, a second overlap of an uplink control channel and at least one uplink shared channel having the same priority level, if the second overlap is present; and a third resolution of two or more channels having a different priority level after the first resolution and the second resolution.

In aspect 30, the method of aspect 29 further includes that the third resolution of the two or more channels having the different priority level includes: a fourth resolution of a third overlap of multiple uplink control channels of different priority levels, if the third overlap is present; and a fifth resolution of a fourth overlap of the uplink control channel and an uplink shared channel of the different priority levels.

In aspect 31, the method of aspect 30 further includes that the fifth resolution of the fourth overlap includes: reception of a first uplink message including the uplink control channel and a second uplink message including the uplink shared channel simultaneously, if a condition is satisfied; and reception of a single, multiplexed message comprising the first uplink message and the second uplink message, if the condition is not satisfied.

In aspect 32, the method of aspect 31 further includes that the condition is based on one or more of: a capability of the UE that supports simultaneous PUCCH and PUSCH transmission on different component carriers, or an enablement of the simultaneous PUCCH and PUSCH transmission on the different component carriers.

Aspect 33 is an apparatus for wireless communication at a network node, comprising means to perform the method of any of aspects 29-32.

In aspect 34, the apparatus of aspect 33 further comprising at least one antenna.

In aspect 35, the apparatus of aspect 33 or aspect 34 further comprising a transceiver.

Aspect 36 is an apparatus for wireless communication at a network node, comprising: memory; and at least one processor coupled to the memory, the memory and the at least one processor configured to implement the method of any of aspects 29-32.

In aspect 37, the apparatus of aspect 36, further comprising at least one antenna.

In aspect 38, the apparatus of aspect 36 or aspect 37, further comprising a transceiver.

Aspect 39 is a non-transitory computer-readable medium storing computer executable code for wireless communication at a network node, the code when executed by a processor causes the processor to implement the method of any of aspects 29-32.

What is claimed is:

1. A method of wireless communication at a user equipment (UE), comprising:
   receiving control signaling that indicates that the UE is scheduled to transmit one or more uplink control channel messages that overlap in a time domain with one or more uplink shared channel messages scheduled for transmission;
   resolving a first overlap of uplink control channels having a same priority level, if the first overlap is present;

resolving, after resolving the first overlap, a second overlap of an uplink control channel and at least one uplink shared channel having the same priority level, if the second overlap is present;

resolving two or more channels having a different priority level after resolving the first overlap and the second overlap, wherein resolving the two or more channels having the different priority level includes:

resolving a third overlap of multiple uplink control channels of different priority levels, if the third overlap is present; and resolving a fourth overlap of the uplink control channel and an uplink shared channel of the different priority levels; and transmitting one or more uplink transmissions including at least one of the one or more uplink control channel messages and the one or more uplink shared channel messages.

2. The method of claim 1, wherein the control signaling schedules the one or more uplink control channel messages on a first component carrier and the one or more uplink shared channel messages are scheduled on a second component carrier.

3. The method of claim 1, wherein resolving the fourth overlap includes:

transmitting a first uplink message including the uplink control channel and a second uplink message including the uplink shared channel simultaneously, if a condition is satisfied; and transmitting a single, multiplexed message comprising the first uplink message and the second uplink message, if the condition is not satisfied.

4. The method of claim 3, wherein the condition is based on one or more of:

a capability of the UE that supports simultaneous physical uplink control channel (PUCCH) and physical uplink shared channel (PUSCH) transmission on different component carriers, or an enablement of the simultaneous PUCCH and PUSCH transmission on the different component carriers.

5. The method of claim 3, wherein the condition is based on:

a capability of the UE that supports simultaneous physical uplink control channel (PUCCH) and physical uplink shared channel (PUSCH) transmission on different component carriers, and an enablement of the simultaneous PUCCH and PUSCH transmission on the different component carriers.

6. The method of claim 1, wherein resolving the third overlap includes:

multiplexing a lower priority physical uplink control channel (PUCCH) with a higher priority PUCCH.

7. The method of claim 1, wherein resolving the third overlap includes:

dropping a lower priority physical uplink control channel (PUCCH) transmission.

8. The method of claim 1, wherein resolving the first overlap includes:

multiplexing a first control channel and a second control channel of the same priority level.

9. The method of claim 1, wherein resolving the second overlap includes:

transmitting a first uplink message and a second uplink message simultaneously, if a condition is satisfied; and transmitting a single, multiplexed message comprising the first uplink message and the second uplink message, if the condition is not satisfied.

10. The method of claim 9, wherein the condition is based on one or more of:

a capability of the UE that supports simultaneous physical uplink control channel (PUCCH) and physical uplink shared channel (PUSCH) transmission on different component carriers, an enablement of the simultaneous PUCCH and PUSCH transmission on the different component carriers, or a priority level of the uplink control channel and the at least one uplink shared channel having the same priority level.

11. The method of claim 10, wherein the UE multiplexes the uplink control channel and the at least one uplink shared channel having the same priority level if the same priority level is a low priority level.

12. The method of claim 1, wherein resolving the second overlap includes:

multiplexing the uplink control channel and the at least one uplink shared channel having the same priority level.

13. An apparatus for wireless communication at a user equipment (UE), comprising:

memory; and at least one processor coupled to the memory and configured to:

receive control signaling that indicates that the UE is scheduled to transmit one or more uplink control channel messages that overlap in a time domain with one or more uplink shared channel messages scheduled for transmission;

resolve a first overlap of uplink control channels having a same priority level, if the first overlap is present;

resolve, after resolving the first overlap, a second overlap of an uplink control channel and at least one uplink shared channel having the same priority level, if the second overlap is present;

resolve two or more channels having a different priority level after resolving the first overlap and the second overlap, wherein the at least one processor is configured to:

resolve a third overlap of multiple uplink control channels of different priority levels, if the third overlap is present; and resolve a fourth overlap of the uplink control channel and an uplink shared channel of the different priority levels; and transmit one or more uplink transmissions including at least one of the one or more uplink control channel messages and the one or more uplink shared channel messages.

14. The apparatus of claim 13, wherein the control signaling schedules the one or more uplink control channel messages on a first component carrier and the one or more uplink shared channel messages are scheduled on a second component carrier.

15. The apparatus of claim 13, wherein to resolve the fourth overlap, the at least one processor is further configured to:

transmit a first uplink message including the uplink control channel and a second uplink message including the uplink shared channel simultaneously, if a condition is satisfied; and transmit a single, multiplexed message comprising the first uplink message and the second uplink message, if the condition is not satisfied.

16. The apparatus of claim 15, wherein the condition is based on one or more of:

a capability of the UE that supports simultaneous physical uplink control channel (PUCCH) and physical uplink shared channel (PUSCH) transmission on different component carriers, or
an enablement of the simultaneous PUCCH and PUSCH transmission on the different component carriers.

17. The apparatus of claim 15, wherein the condition is based on:
a capability of the UE that supports simultaneous physical uplink control channel (PUCCH) and physical uplink shared channel (PUSCH) transmission on different component carriers, and
an enablement of the simultaneous PUCCH and PUSCH transmission on the different component carriers.

18. The apparatus of claim 13, wherein to resolve the third overlap, the at least one processor is configured to:
multiplex a lower priority physical uplink control channel (PUCCH) with a higher priority PUCCH.

19. The apparatus of claim 13, wherein to resolve the third overlap, the at least one processor is configured to:
drop a lower priority physical uplink control channel (PUCCH) transmission.

20. The apparatus of claim 13, wherein to resolve the first overlap, the at least one processor is configured to:
multiplex a first control channel and a second control channel of the same priority level.

21. The apparatus of claim 13, wherein to resolve the second overlap, the at least one processor is configured to:
transmit a first uplink message and a second uplink message simultaneously, if a condition is satisfied; and
transmit a single, multiplexed message comprising the first uplink message and the second uplink message, if the condition is not satisfied.

22. The apparatus of claim 21, wherein the condition is based on one or more of:
a capability of the UE that supports simultaneous physical uplink control channel (PUCCH) and physical uplink shared channel (PUSCH) transmission on different component carriers,
an enablement of the simultaneous PUCCH and PUSCH transmission on the different component carriers, or
a priority level of the uplink control channel and the at least one uplink shared channel having the same priority level.

23. The apparatus of claim 22, wherein the at least one processor is configured to multiplex the uplink control channel and the at least one uplink shared channel having the same priority level if the same priority level is a low priority level.

24. The apparatus of claim 13, wherein to resolve the second overlap, the at least one processor is configured to:
multiplex the uplink control channel and the at least one uplink shared channel having the same priority level.

25. The apparatus of claim 24, further comprising at least one of an antenna or a transceiver coupled to the at least one processor and configured to transmit the one or more uplink transmissions.

26. An apparatus for wireless communication at a network node, comprising:
memory; and
at least one processor coupled to the memory and configured to:
transmit control signaling that schedules a user equipment (UE) to transmit one or more uplink control channel messages that overlap in a time domain with one or more uplink shared channel messages scheduled for transmission; and
receive one or more uplink transmissions including at least one of the one or more uplink control channel messages and the one or more uplink shared channel messages based on:
a first resolution of a first overlap of uplink control channels having a same priority level, if the first overlap is present;
a second resolution after the first resolution of the first overlap, a second overlap of an uplink control channel and at least one uplink shared channel having the same priority level, if the second overlap is present; and
a third resolution of two or more channels having a different priority level after the first resolution and the second resolution, wherein the third resolution of the two or more channels having the different priority level includes:
a fourth resolution of a third overlap of multiple uplink control channels of different priority levels, if the third overlap is present; and
a fifth resolution of a fourth overlap of the uplink control channel and an uplink shared channel of the different priority levels.

27. The apparatus of claim 26, wherein the fifth resolution of the fourth overlap includes:
reception of a first uplink message including the uplink control channel and a second uplink message including the uplink shared channel simultaneously, if a condition is satisfied; and
reception of a single, multiplexed message comprising the first uplink message and the second uplink message, if the condition is not satisfied.

28. The apparatus of claim 27, wherein the condition is based on one or more of:
a capability of the UE that supports simultaneous physical uplink control channel (PUCCH) and physical uplink shared channel (PUSCH) transmission on different component carriers, or
an enablement of the simultaneous PUCCH and PUSCH transmission on the different component carriers.

29. The apparatus of claim 27, wherein the condition is based on:
a capability of the UE that supports simultaneous physical uplink control channel (PUCCH) and physical uplink shared channel (PUSCH) transmission on different component carriers, and
an enablement of the simultaneous PUCCH and PUSCH transmission on the different component carriers.

30. A method of wireless communication at a network node, comprising:
transmitting control signaling that schedules a user equipment (UE) to transmit one or more uplink control channel messages that overlap in a time domain with one or more uplink shared channel messages scheduled for transmission; and
receiving one or more uplink transmissions including at least one of the one or more uplink control channel messages and the one or more uplink shared channel messages based on:
a first resolution of a first overlap of uplink control channels having a same priority level, if the first overlap is present;
a second resolution after the first resolution of the first overlap, a second overlap of an uplink control channel and at least one uplink shared channel having the same priority level, if the second overlap is present; and a third resolution of two or more channels having a different priority level after the first resolution and the second resolution, wherein the third resolution of the two or more channels having the different priority level includes:
   a fourth resolution of a third overlap of multiple uplink control channels of different priority levels, if the third overlap is present; and
   a fifth resolution of a fourth overlap of the uplink control channel and an uplink shared channel of the different priority levels.

\* \* \* \* \*